(12) United States Patent
Ahrens

(10) Patent No.: US 12,150,027 B2
(45) Date of Patent: Nov. 19, 2024

(54) EARLY ALERT AND LOCATION INTELLIGENCE GEOGRAPHIC INFORMATION SYSTEM

(71) Applicant: Armor at Hand, Hermosa Beach, CA (US)

(72) Inventor: Chad A. Ahrens, Hermosa Beach, CA (US)

(73) Assignee: Armor at Hand, Hermosa Beach, CA (US)

( * ) Notice: Subject to any disclaimer, the term of this patent is extended or adjusted under 35 U.S.C. 154(b) by 27 days.

(21) Appl. No.: 17/860,703

(22) Filed: Jul. 8, 2022

(65) Prior Publication Data
US 2022/0345869 A1   Oct. 27, 2022

Related U.S. Application Data

(63) Continuation-in-part of application No. 17/206,825, filed on Mar. 19, 2021, now Pat. No. 11,595,786.

(51) Int. Cl.
| | | |
|---|---|---|
| *H04W 4/029* | (2018.01) | |
| *G06F 3/0482* | (2013.01) | |
| *G06F 3/04847* | (2022.01) | |
| *G08B 7/06* | (2006.01) | |
| *G08B 25/00* | (2006.01) | |
| *G08B 31/00* | (2006.01) | |
| *G16Y 10/60* | (2020.01) | |
| *G16Y 10/75* | (2020.01) | |
| *G16Y 20/10* | (2020.01) | |
| *G16Y 40/60* | (2020.01) | |
| *H04M 1/72421* | (2021.01) | |
| *H04M 1/72457* | (2021.01) | |
| *H04W 4/90* | (2018.01) | |

(52) U.S. Cl.
CPC .............. *H04W 4/90* (2018.02); *G16Y 10/75* (2020.01); *G16Y 40/60* (2020.01)

(58) Field of Classification Search
CPC ........ H04W 4/029; H04W 4/90; G08B 7/066; G08B 25/006; G08B 31/00; H04M 1/72421; H04M 1/72457; G06F 3/0482; G06F 3/04847; G16Y 10/60; G16Y 20/10
See application file for complete search history.

(56) References Cited

U.S. PATENT DOCUMENTS

| | | | | |
|---|---|---|---|---|
| 2019/0182649 A1* | 6/2019 | Best | ...................... | H04W 4/023 |
| 2021/0153001 A1* | 5/2021 | Eisner | ..................... | H04W 4/90 |

* cited by examiner

*Primary Examiner* — Lewis G West
(74) *Attorney, Agent, or Firm* — Schmelzer IP; Troy Schmelzer

(57) ABSTRACT

An early alert and location intelligence geographic information system (GIS) includes a plurality of Internet of Thing (IoT) devices and a GIS system. The GIS system tracks locations and movements of the IoT devices and is activated when an IoT device signals detection of a threat or an urgent medical need. Based on locations and escalating state changes of the IoT devices, alerts are provided to the IoT devices, and the threat location, a danger zone and a buffer zone are calculated and displayed on a mobile software application. Based on device proximity to the threat location, the GIS system communicates escape directions and shelter guidance to the mobile software applications of those affected. Smart alert escalations are provided as needed to security, law enforcement and medical personnel.

19 Claims, 35 Drawing Sheets

Active Device List 322

If "Initial Shield" has In-Sight Press event then it is again added to the list with new start time.

Maximum of top 8 with most time remaining are used for polygon.

If, "On-Time Remaining" True, event is available for polygon.

Eligible for Polygon but Limited by 8 Max.

| Device ID | Condition | Device Active | Device On-Time Max | In-Sight Press Time | On-Time Remaining Count | On-Time Remaining | Sort By Most Time Remaining | In Polygon? Yes/No |
|---|---|---|---|---|---|---|---|---|
| Device 3 | In-Sight Button Press | True | 10 | 1 | 9 | True | 1 | Y |
| Device 9 | In-Sight Button Press | True | 10 | 1 | 9 | True | 2 | Y |
| Device 5 | In-Sight Button Press | True | 10 | 2 | 8 | True | 3 | Y |
| Device 8 | In-Sight Button Press | True | 10 | 2 | 8 | True | 4 | Y |
| Device 7 | In-Sight Button Press | True | 10 | 3 | 7 | True | 5 | Y |
| Device 4 | In-Sight Button Press | True | 10 | 3 | 7 | True | 6 | Y |
| Device 6 | In-Sight Button Press | True | 10 | 4 | 6 | True | 7 | Y |
| Device 10 | In-Sight Button Press | True | 10 | 5 | 5 | True | 8 | Y |
| Device 11 | In-Sight Button Press | True | 10 | 6 | 4 | True | 9 | N |
| Device 3 | In-Sight Button Press | True | 10 | 12 | -2 | False | 10 | N |
| Device 2 | In-Sight Button Press | True | 10 | 14 | -4 | False | 11 | N |
| Device 1 | Movement | True | | | | | 12 | N |

FIG. 7

Calculated Attack Center

1st Device and 2nd Device combined

Polygon Starts with 3 active devices up to a maximum of 8

Buffer Zone Perimeter Circumference Around Calculated Attack Center

Buffer Zone Perimeter Polygon Around Calculated Attack Polygon

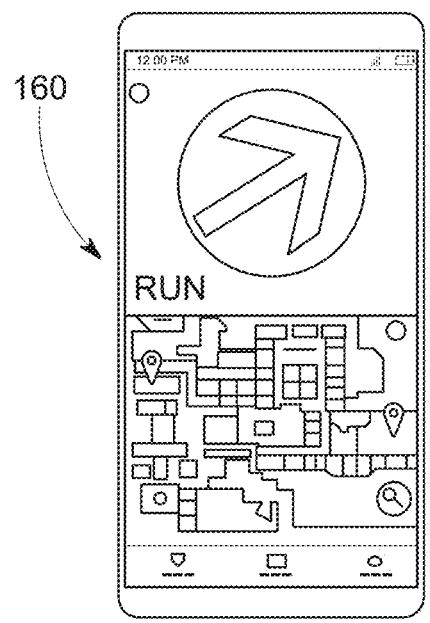
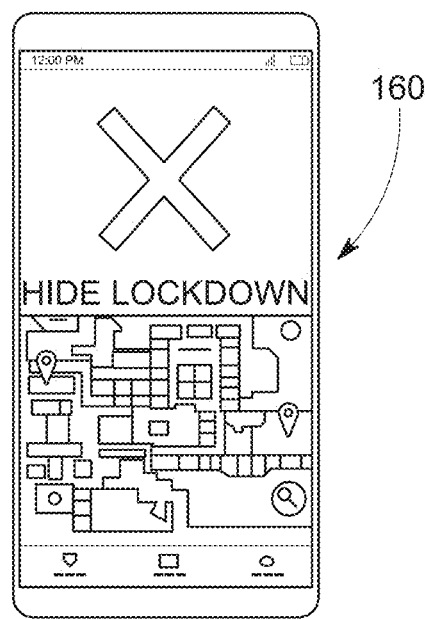
FIG. 13A
FIG. 13B

EARLY ALERT AND LOCATION INTELLIGENCE GEOGRAPHIC INFORMATION SYSTEM

CROSS-REFERENCE TO RELATED APPLICATIONS

This application is a continuation-in-part of U.S. application Ser. No. 17/206,825, filed on Mar. 19, 2021, the contents of which are incorporated herein by reference.

BACKGROUND

Violent acts and urgent medical needs are common within workplaces, schools, government buildings, hospitals, places of worship, in urban areas and in other public event spaces. A response time of 2-5 minutes to such events is typically the best that can be achieved. During those first 2-5 minutes, there is often a rapid and exponential escalation from threat to terrible harm.

An urgent medical need can arise in the office or in the classroom next door without anyone knowing, with precious time to save lives from being lost. Other people nearby that could help are not alerted and once they are aware of the medical need the location is not easily shared.

A violent attack can be very dynamic, as the threat is often moving and affecting multiple people. More harm occurs because the location of the attacker is not known, and the incidents are terrifying for those affected. It is difficult for first responders to end the incident without knowing the location of the attacker. Worse yet, though immediate medical assistance is needed for incidents that occur as the attack progresses, medical responders are unable to provide that assistance since they do not know the locations of the incidents Staff, students, congregations, and others in public spaces are typically trained to exit a threat area as quickly as possible. However, a safe escape route may not be readily apparent. Moreover, pursuing an escape route could inadvertently put one within sight of the attacker. On the other hand, staying in place or hiding may trap people within an area and render them defenseless. With every movement of the attacker, the options change for those affected.

SUMMARY

The present invention solves these problems by providing a system of dedicated Internet of Things (IoT) devices that geo-locate the incident, alert those nearby, and alert a succession of others up to first responders and 911. By providing geo-locations and smart alerts, immediate intervention, and de-escalation before there is harm is possible. The invention also provides means for determining and sharing locations of the moving attacker, those initially affected, and those affected as the attack progresses. By locating the moving threat, those affected can be guiding to safety.

The present invention provides early alert and intervention for people confronted with violence or an urgent medical condition. Upon autonomous or manual activation of an Internet of Things (IoT) device (which may be wearable) during an incident, nearby IoT devices are alerted based on their proximity to the activated IoT device. The alert also escalates to others as needed such as security personnel, first responders and 911 personnel. The IoT device alert may include audio, visual and vibration alert components. Help is instantly summoned for those affected, and others are made aware that a violent threat or medical emergency exists. Alerts are made to appropriate user profiles based on the type of emergency, its severity, and the proximity of users to the incident. Early intervention provides an opportunity to deescalate a violent threat before there is harm is, and to provide immediate care for medical emergencies.

The present invention provides a plurality of IoT devices whose movements are geo-located and tracked. An indicator for each IoT device, based on the state of the device, is shown on 2D or 3D geographic information system (GIS) site or parcel maps. When the state of a device changes, the corresponding indicator for the device changes and moves on the site or parcel map in real-time. If a device is "asleep", for example, its indicator may be green. If the device is awakened because of a violent threat, its indicator may be red. If urgent medical care is needed for the user of the device, its indicator may be blue. For violent threats, a threat location danger zone and a buffer area are also indicated on the site or parcel map. As the threat moves through the site or parcel map, "breadcrumb" indications follow its path, and the states of the surrounding devices change as they enter and exit the threat buffer area. Based on the threat location, the indicators may change to a large green arrow, for example, pointing to a route away from the threat and guiding those affected to an escape path. Alternatively, the indicators may change to a large red X, for example, which is a suggestion to shelter-in-place.

Separate from the IoT device, a GIS mobile application displays IoT device indicators in real-time on a site or parcel map on a user mobile device, such as on a phone, on a tablet, or in a computer browser. From the GIS mobile application, users can indicate the severity of the event, increase or decrease the buffer zone surrounding the threat area, join a security team call, place a 911 call to a local 911 center, and/or input an "all clear" indication to end the incident. The GIS mobile application is used by those that are being protected and is also shared externally with first responders, enabling precise location of and response to the threat or medical need.

The present invention, including the IoT devices, the associated GIS system, and the GIS mobile application, is suitable for urban areas, workplaces, schools, hospitals, places of worship and any other space where people gather. IoT devices may be deployed to staff, citizens, and first responders, including law enforcement, medical, and firefighting personnel. Deployments to various groups in a given area creates a unified, area-wide, GIS driven response system of shared information.

One embodiment of the system "awakens" an IoT device in five different scenarios: 1) detection of motion over a pre-defined threshold for a pre-defined time; 2) detection of a g force over a pre-defined threshold; 3) detection of degrees of orientation over a predefined number of degrees; 4) on press of an "In-Sight" button; or 5) on slide of an emergency or "Med-Alert" switch. When the device awakens, an alert is immediately sent via wireless transmission by a processing module in the device to a central server. The central server, in turn, alerts other IoT and mobile devices based on their geo-location proximity to the incident and based on their profile settings (such as first responders). Vibration, audio, and visual alert capabilities are provided on the IoT devices.

The IoT devices perform edge processing and computation, and store data such as device and alert states as well as pre-recorded video, text, and audio. A mobile software application is provided on a user-connected computer or mobile device in communication with a central server, which includes an online GIS site or parcel map showing device indicators, locations, and movements. Each device is depicted as an icon on the online map, with its color and appearance indicating the state of the device, whether the device is moving, the rate of motion of the device and whether the user has pressed a button indicating that an attacker is "In-Sight" or has activated the "Med-Alert" switch indicating that medical assistance is needed.

Location data gathered by the IoT device and sent to the server is used to generate and overlay on the map the attacker location, a danger zone and buffer area surrounding the attacker location, and the attacker's path of movement. Location data, such as which IoT devices are moving, the locations and rates of movement of the moving devices, order of movement of the devices, and which devices are signaling an attacker-in-sight or need for medical assistance, can be used to predict future movement of the attacker. An "instant on" audio listen and record option and speaker enabling voice communication from first responders to those affected may also be provided.

Another aspect of the invention is to utilize the most highly accurate positioning technologies available, such as ultra-wide band (UWB) and/or Bluetooth technologies. When these more accurate positioning infrastructure technologies are available, a seamless transition occurs to the more accurate indoor positioning system. In one non-limiting example, highly accurate positioning technologies such as UWB and Bluetooth may be utilized as an indoor positioning system (IPS). If such positioning infrastructure is not available, full system operation remains available through cellular, Wi-Fi and/or the global positioning system (GPS).

Another aspect of the invention is the provision of multi-site alerts to adjacent and nearby sites and/or parcels. An adjacent site or parcel may be alerted of an ongoing incident in a nearby site or parcel. The security team in the adjacent site or parcel receives the multi-site alert and has the option to accept or not accept the alert. On acceptance, the threat location center, active devices, and buffer area appear as a multi-site view in the system of the adjacent site or parcel.

Another aspect of the invention is use of a smart phone compass-heading data field to enhance the accuracy of a calculated threat location. If smart phone camera or video is on (likely pointed at the threat), the compass-heading data field is captured at regular time intervals and at the time that the in-sight button is pressed. Knowing the direction of the threat relative to the user further enhances the accuracy of the threat location, particularly when multiple incidents are occurring at the same time. In this regard, another aspect of the invention is to track and prioritize multiple incidents concurrently. Another aspect of the invention is to enhance the accuracy and reliability of the compass magnetometer using north sensing IoT device hardware, north directional transmitting anchors and/or gateways, and supporting software.

Another aspect of the invention is a multiple device merge. A single user can have multiple IoT devices such as phones, watches, real time location system (RTLS) devices, etc. During an incident, the invention prioritizes the primary device for system data inputs and if the devices are separated both devices are tracked.

Another aspect of the invention is alerting pre-chosen emergency contacts or friends ("rescue friends") in the event of a threat or medical alert. If help is needed and the pre-chosen rescue friend is nearby, the friend's mobile application will display the victim's rescue location and the nearby friends are directed to the location. The friend may increase the threat level of severity, thereby alerting other responders and may place a call to 911, sharing the location of the friend in need with the 911 center covering the rescue location.

Additional aspects of this disclosure are depicted and described in the accompanying drawings and the following description.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different figures. The drawings depict illustrative examples of this disclosure and are not limiting in scope.

FIG. 7 is a table setting forth an exemplary active device list, according to the present invention.

FIG. 13A depicts the mobile application as displayed on a phone, with a directional arrow pointing away from the threat location, according to the present invention.

FIG. 13B depicts the mobile application as displayed on a phone, with an "X" to indicate instructions to shelter-in-place, according to the present invention.

DETAILED DESCRIPTION

This invention is directed to an early alert and location intelligence geographic information system (GIS). The system is comprised of a plurality of Internet of Thing (IoT) devices whose movements are geo-located and tracked, a GIS system of central computer servers, and a mobile application. The IoT devices are deployed to and worn by users, citizens, staff, and first responders including law enforcement, medical, and firefighting personnel in a workplace, school, place of worship, or any other public space. The IoT devices communicate with and send alerts to nearby IoT devices, and communicate with the GIS system, which produces outputs back to the IoT devices, to the mobile application and to other third-party systems. Separate from the IoT device, the mobile application displays the site or parcel map with indicators in real-time on a user mobile device, such as on a phone, tablet, or computer browser.

In one non-limiting example, the system of the present invention has three geographic levels: account, parcel, and site. Accounts may be for an individual at any location, for a city or other region, or for a business. Accounts may or may not have a geofenced geographic perimeter. Accounts can be overlapping, resulting in the ability to send notifications to multiple accounts and their responders for a single incident location. Accounts can have no parcels or any number of parcels. Parcels have a geofenced geographic perimeter and may have no sites or any number of sites. Sites are the smallest geographic unit and have a geofenced geographic perimeter such as a building or parking lot. In the following description, the terms "site", "parcel" or "account" may be used interchangeably.

Figure 1:
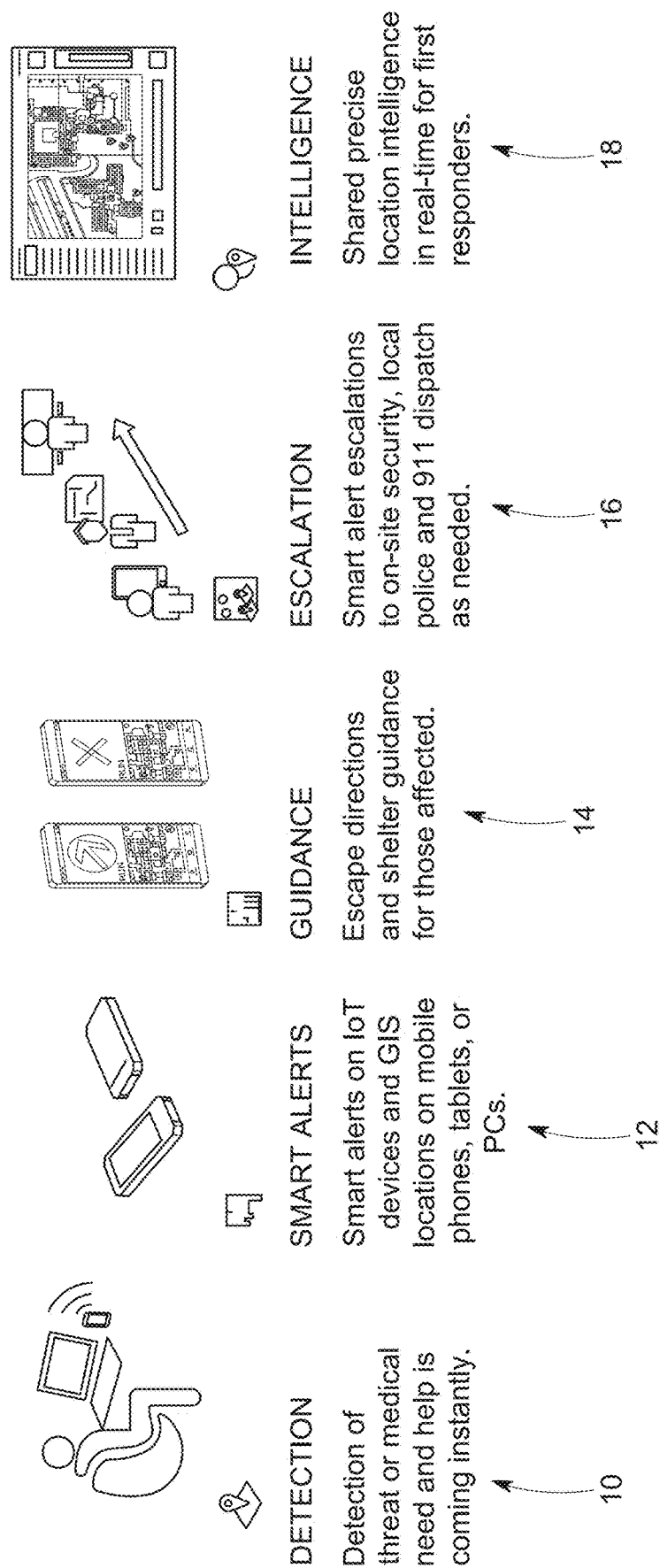
FIG. 1 is a conceptual overview diagram of the present invention.

An overview of the present invention is shown in FIG. 1. The system is initiated when an IoT device signals detection of a threat or urgent medical need. Help, if needed is dispatched immediately based on the location of the device and the threat or need (10). Based on processing by a GIS system, smart alerts are provided on user IoT devices, and GIS locations are indicated on a mobile software application on user phones, tablets and/or PCs (12). The GIS system communicates escape directions and shelter guidance to the mobile applications of those affected (14). Smart alert escalations to personnel such as on-site security, law enforcement, first responders and 911 dispatchers are provided as needed (16). Precise location intelligence is shared in real-time with personnel such as on-site security, law enforcement, first responders and 911 dispatchers (18).

Figure 2:
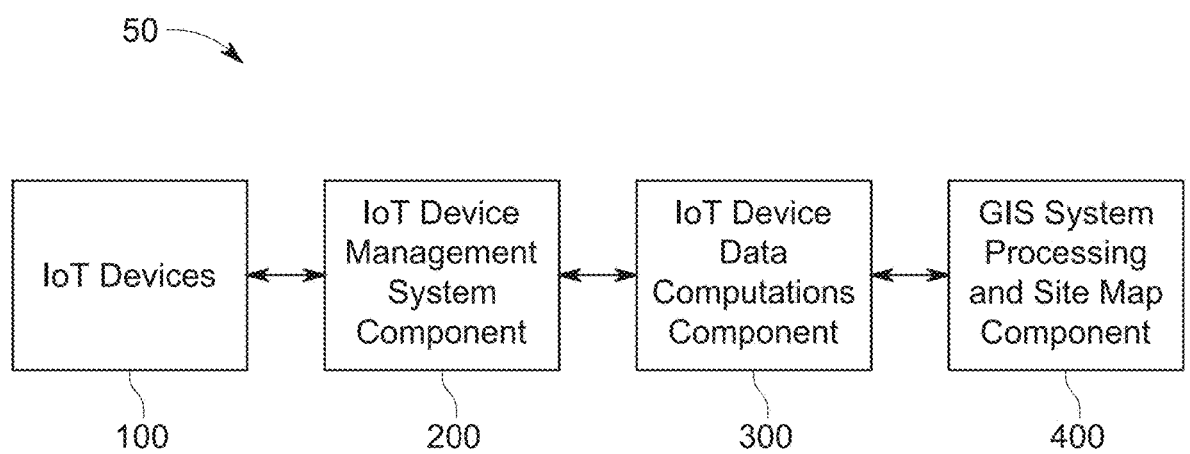
FIG. 2 is a block diagram of a GIS system, according to the present invention.
Figure 3:
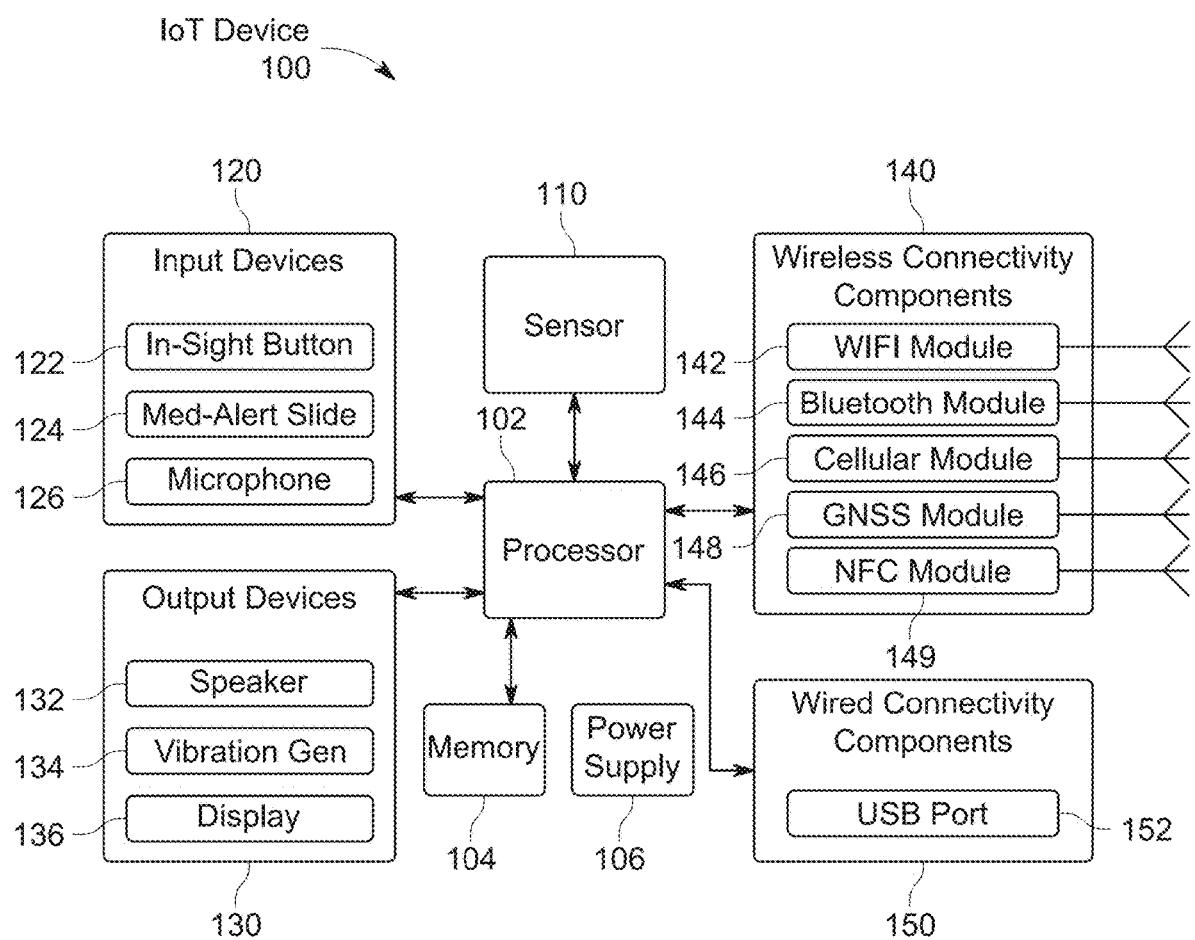
FIG. 3 is a block diagram of an IoT device, according to the present invention.
Figure 4:
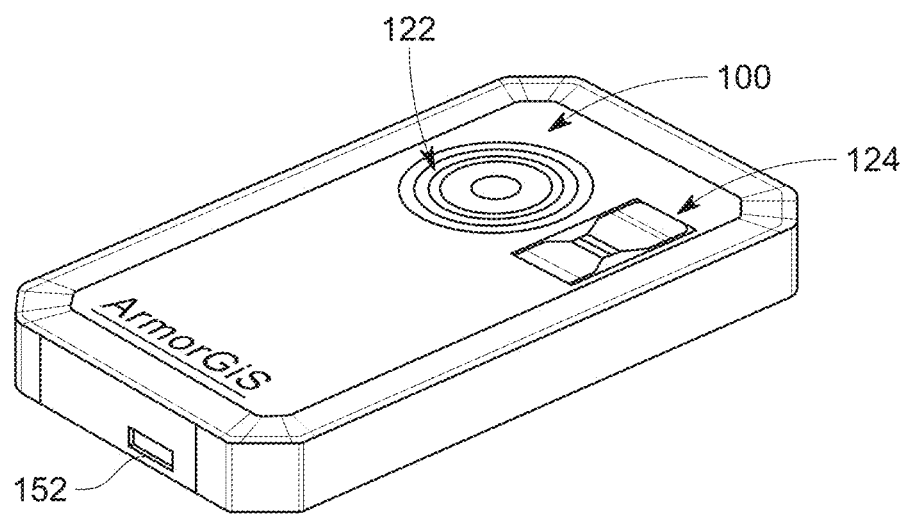
FIG. 4 is a perspective view of an IoT device, according to the present invention.

FIG. 2 is a block diagram of a GIS system 50 according to the present invention. GIS system 50 includes IoT devices 100, device management component 200, data computation component 300 and GIS site map component 400. As shown in FIG. 2, there is two-way communication between all components of GIS system 50. System 50 comprises a plurality of IoT devices 100. An exemplary IoT device 100 is illustrated in more detail FIGS. 3 and 4. IoT device 100 includes processor 102, memory 104 power source 106, movement/acceleration/orientation sensor 110, input devices 120, output devices 130, wireless connectivity components 140, and wired connectivity components 150. FIGS. 3 and 4 depict but one possible implementation of an IoT device that may employ or be configured with aspects of the present invention.

In one embodiment, IoT device 100 is embodied in a compact, hand-held unit, such as that shown in the perspective view of FIG. 4. However, IoT device 100 may be implemented in other ways. For example, IoT device 100 may be incorporated into a hand-held shield, such as that described in applicant's co-pending U.S. application Ser. No. 16/284,338, which is incorporated herein by reference. Alternatively, IoT device may be incorporated into a wearable device such as a watch.

Processor 102 includes firmware for performing edge processing on data captured by IoT device 100. Memory 104 stores data collected by sensor 110 as well as user and configuration data for device 100. Power source 106 provides power to the components of device 100. Sensor 110 captures data indicative of movement, acceleration, and orientation of IoT device 100. In one implementation, sensor 110 is a 9-axis sensor that includes an accelerometer, magnetometer and gyroscope that can detect motion, acceleration, orientation and whether movement is walk, run or stairs movement. Sensor 110 may be, for example, the BN0080/BN0085 sensor from CEVA Technologies, Inc. Additional sensors 110 may optionally be provided, such as environmental sensors to sense variables such as temperature.

Input devices 120 include "in-sight" button 122 allowing a user to signal that an attacker is in sight, emergency or "med-alert" slide switch 124 allowing a user to signal an urgent medical emergency, and microphone 126. The perspective view of FIG. 4 illustrates in-sight button 122 and med-alert slide switch 124 in greater detail. Additional input devices 120 may also be provided such as, for example, a reset button, a mode selection button, programmable buttons and/or a touch screen. Output devices 130 include speaker 132, vibration generator 134 and visual display 136. Visual display 136 may include, for example, LED lights and/or a display screen. Additional output devices 130 may be provided as needed.

Microphone 126 may continuously capture sound recordings that are saved for later analysis. In one implementation, sound recordings are recorded in continuous sixty second loops—sound is recorded for sixty seconds and then written over. When in-sight button 122 is pressed to signal that an attacker is in sight, the prior sixty second recording is saved for later analysis, and a continuous sound recording is made until an all-clear input is made to end the incident.

Wireless connectivity components 140 provide for two-way wireless communication with other IoT devices 100, the other components of system 50, and third-party devices. Wireless connectivity components include Wi-Fi module 142, Bluetooth module 144, cellular module 146, GNSS (global navigation satellite system) module 148, NFC (near field communications) module 149 and their associated antennae. Wired connectivity components 150 may include, for example, USB or USB-C port 152 (FIG. 4). Additional wired connectivity components such as a power input to charge power source 106 may be provided as needed.

Figure 5:
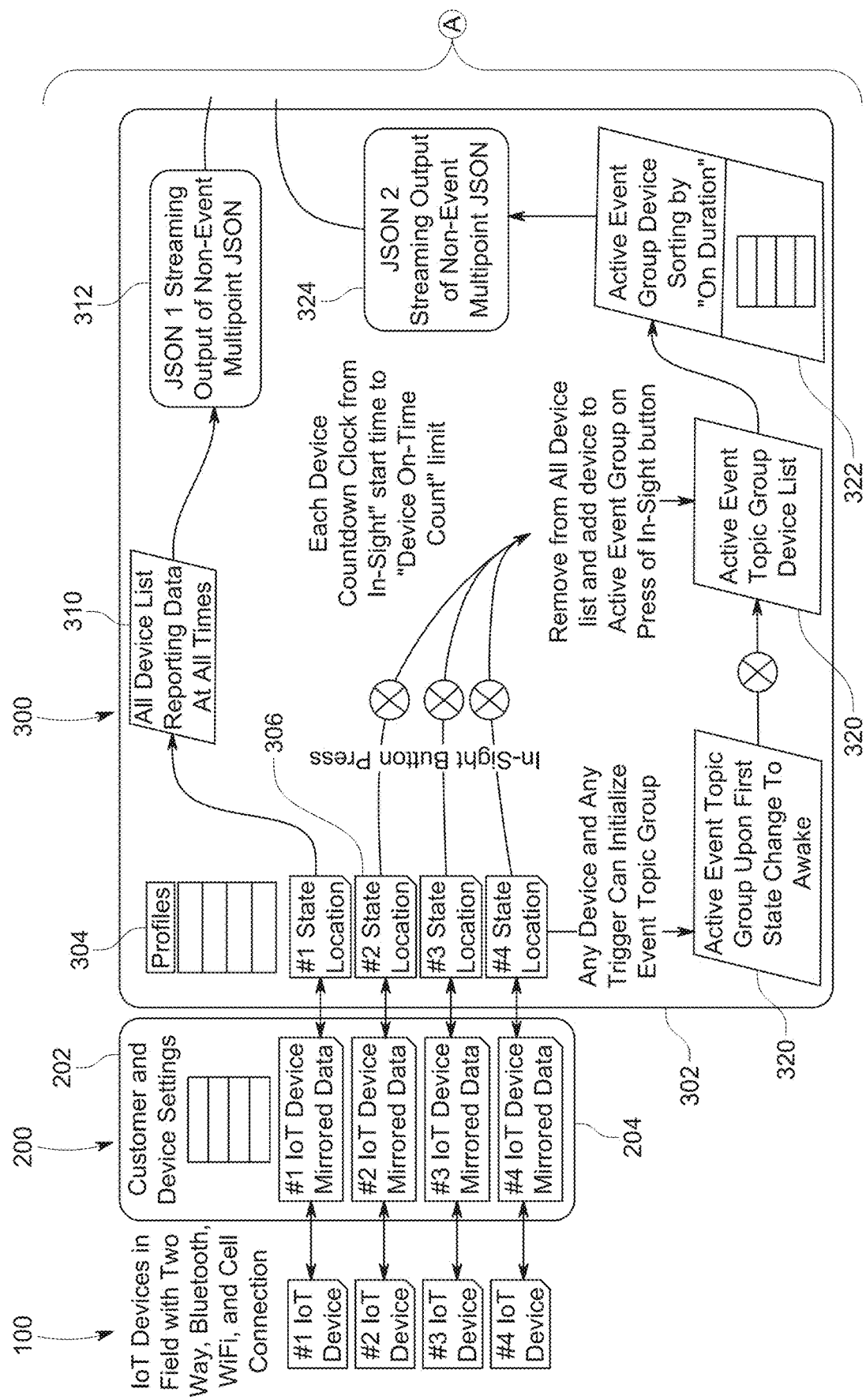
FIG. 5 is a more detailed block diagram and dataflow of the system of the present invention.
Figure 5:
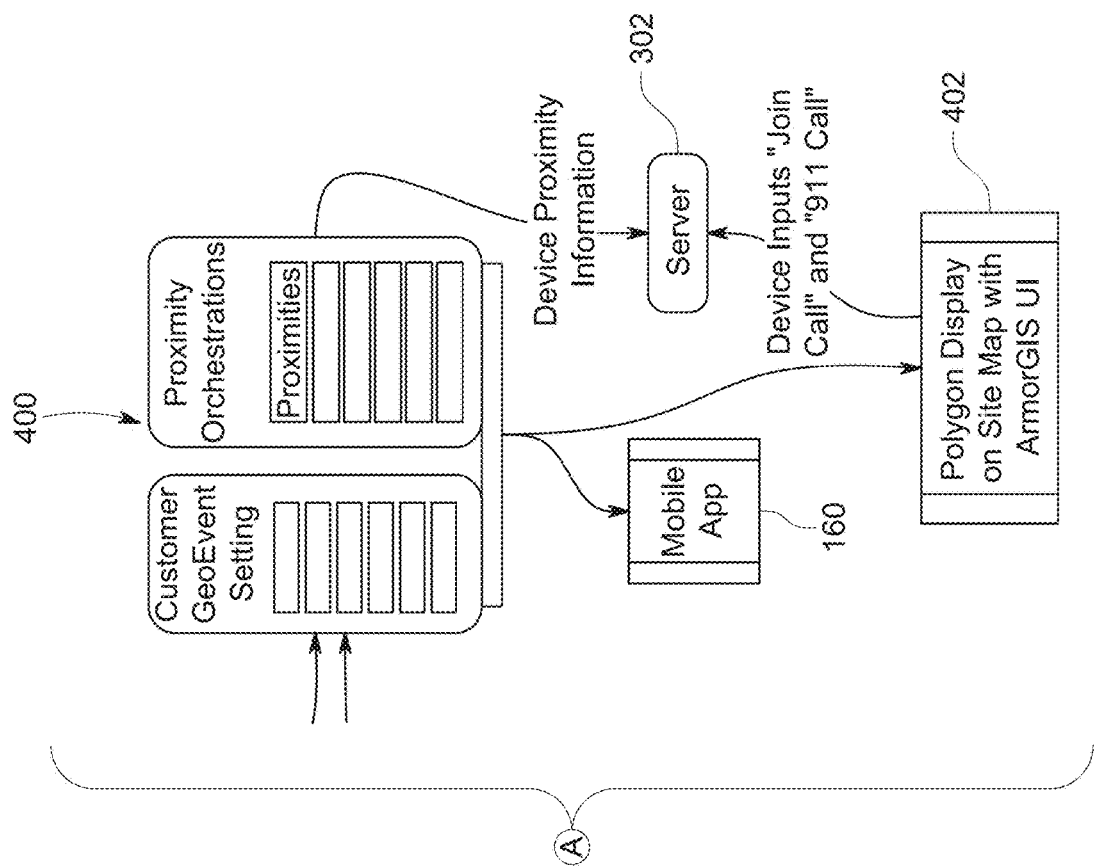
Figure 6:
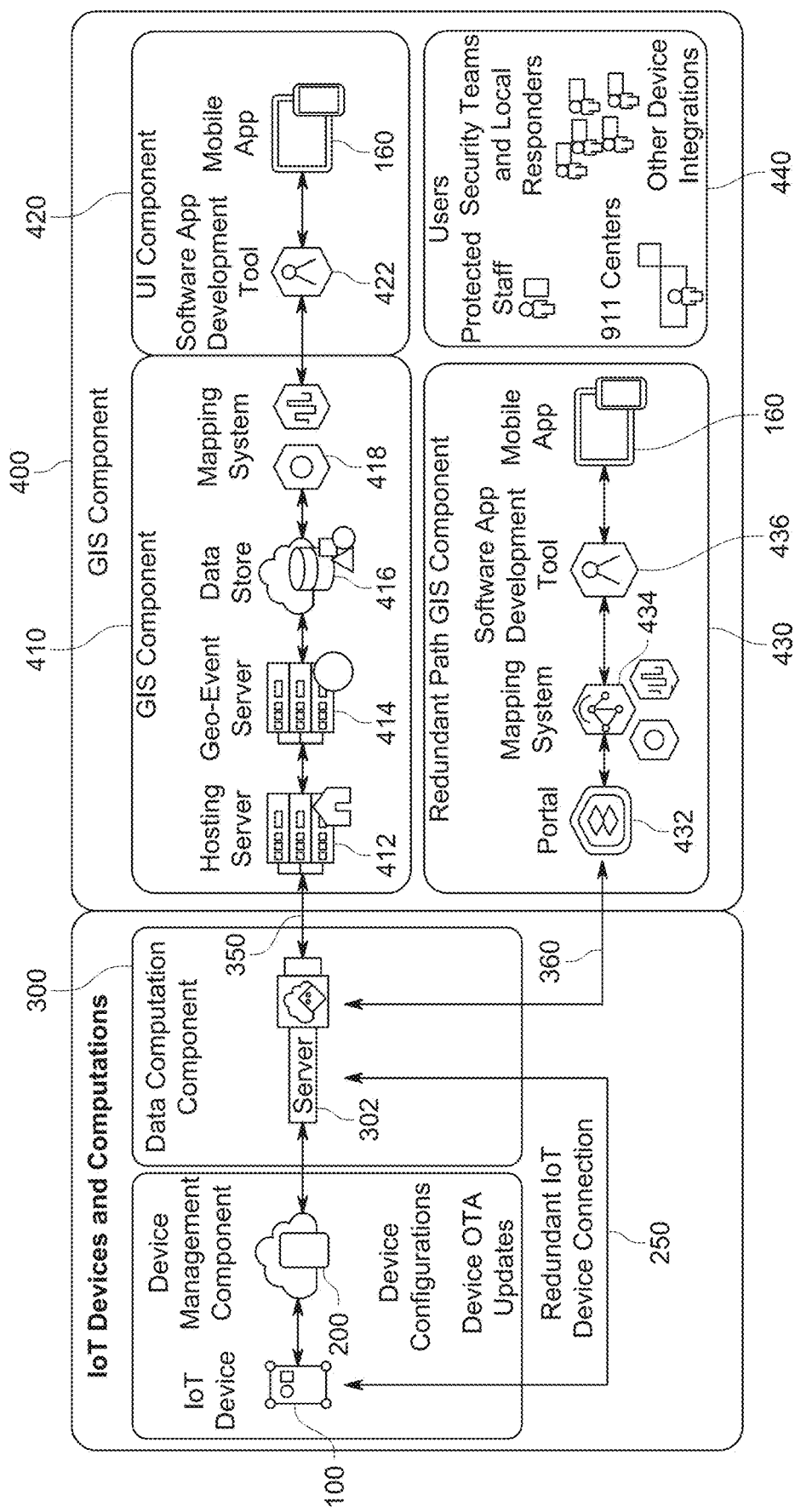
FIG. 6 is a block diagram showing components of FIG. 2 in greater detail.

Components 200, 300 and 400 of system 50 are shown in more detail in FIGS. 5 and 6. Two-way communication occurs between IoT devices 100 and components 200, 300 and 400, which produce outputs to the software application on user mobile devices, and to other third-party systems. Two-way communication occurs amongst IoT devices 100 themselves as well with third-party devices having Wi-Fi, Bluetooth and/or cellular communication capability. Components 200, 300 and 400 include servers that compute and store data, site or parcel maps, customer settings, user profiles, device settings and sensor threshold limits.

Device management component 200 stores the settings and configurations for each user and for each device in central server 202 (IoT device mirrored data 204) and in memory 104 of each IoT device 100. Component 200 may also provide over the air (OTA) updates to IoT devices 100. In one implementation, component 200 is wholly or partially implemented in an edge-to-cloud IoT platform such as that provided by Particle Industries, Inc.

Device management component 200 communicates via the Internet cloud with data computation component 300. To ensure robustness, as shown in FIG. 6, redundant IoT device connection 250 is also provided between IoT devices 100 and data computation component 300. Data computation component 300 includes a central server 302 that, as explained in more detail below, performs computations based on device locations, times, state and other values and variables. In one implementation, server 302 of data computation component 300 is wholly or partially implemented in a cloud computing platform, such as the Amazon Web Services (AWS) IoT core.

Server 302 stores profiles 304 (settings and configurations) for each user and device, and location and state data 306 for each device. Server 302 also maintains an "all device" list 310 of all IoT devices 100 in system 50, including the user profile and location, sensor and state data associated with each device. When an IoT device becomes active, server 302 also creates and maintains an active device group 320. As will be described in more detail herein, devices 100 are added to active device group 320 by triggering events such as changes in movement, acceleration or orientation, or actuation of in-sight button 122 or med-alert slide switch 124. IoT devices 100 in active device group 320 are sorted and prioritized based on variables, such as passage of time and the number of devices in group 320, into an active device list 322.

The data included in all device list 310 and in active device list 322, such as the states, locations, sensor data and profiles for each device, is streamed at 312 and 324 to GIS component 400. In one implementation, this information is streamed from component 300 to component 400 in JSON (JavaScript Object Notation). GIS site map component 400 performs computation including geo-filtering, geo-processing and geo-proximity analysis based on this information. In particular, the geo-locations of the devices in active device list 322 are used to calculate a threat location and are used as polygon points to define a danger zone around the threat location. Device locations relative to the threat location and danger zone, as well as possible escape routes and shelter instructions, or suggestions to shelter in place, are provided by GIS component 400 to mobile applications 160 and to display 402.

In one implementation, GIS site map component 400 is wholly or partly implemented in a cloud-based software-as-a-service (SaaS) platform such as the ArcGIS location intelligence platform provided by Esri (Environmental Systems Research Institute). As shown in FIG. 6, component 400 may be implemented via two redundant GIS paths 350 and 360.

In FIG. 6, first GIS path 350 comprises cloud-based GIS component 410 and a separate user interface component 420. GIS component 410 may be hosted, for example, on the Amazon Web Services (AWS) elastic compute cloud (EC2) virtual server using the Ubuntu Linux operating system, and may comprise hosting server 412, geo-event server 414, data store 416 and mapping system 418. Hosting server 412 supplies mapping and GIS capabilities. Geo-event server 414 tracks the changing locations and states of IoT devices 100, performs analytics on this location and state data, and provides real-time situational awareness. Data store 416 stores the real-time location and state data streamed from geo-event server 414. Mapping system 418 provides 2D and 3D indoor and outdoor (urban) maps into which the location and state data of devices 100 may be incorporated. Mapping system 418 may also provide remote area maps. In the embodiment of FIG. 6, hosting server 412, geo-event server 414, data store 416 and mapping system 418 are implemented as ArcGIS SaaS platforms hosted on the AWC EC2 cloud computing platform. Alternatively, or in addition, the information from component 300 may be communicated to an alternative GIS system.

First GIS path 350 further comprises user interface component 420. User interface component 420 includes software application development tool 422 which, using the data streamed from GIS component 410, creates mobile application 160 that is deployed on mobile devices of the IoT device users. In the embodiment of FIG. 6, mobile application development tool 422 is implemented as the ArcGIS AppStudio platform hosted on Esri cloud-based servers. Alternatively, mobile application 160 is built natively in the IoS and/or Android operating systems, for example.

In the second (redundant) GIS path 360, the GIS and user interface components are combined and hosted on a single component 430. Component 430 comprises portal 432, mapping system 434, mobile application development tool 436 and mobile application 160. Portal 432 supplies mapping and GIS capabilities, tracks the changing locations and states of IoT devices 100, and stores and performs analytics on this location and state data. Mapping system 434 provides indoor, outdoor (urban) and remote area maps into which the location and state data of devices 100 may be incorporated. Mobile application development tool 436, using the data streamed from portal 432 and mapping system 434, creates software application 160 that is deployed on user mobile devices. In the embodiment of FIG. 6, portal 432, mapping system 434 and tool 436 are implemented as ArcGIS SaaS platforms hosted on Esri cloud-based servers.

Users 440 including protected persons/staff, security teams and local responders, 911 centers and other device integrations may have access, which may vary based on their user profile and permissions, to mobile application 160 generated by GIS site map component 400.

Activation and operation of the components of system 50 is premised on escalating changes of the state of IoT devices 100. In sum, based on data received from IoT devices 100, device management component 200 changes the states of IoT devices 100 in escalating stages from "asleep", to "awake", to "alert" to "alarm". Device management component 200 reports these state changes to data computation component 300, which creates active device list 322 of all active devices involved in the incident, based on their reporting state. GIS site map component 400 uses the geo-locations of active devices as polygon points to calculate a threat location and to define a danger zone around the threat location, and a buffer area around the danger zone. The danger zone and buffer area are incorporated into a site or parcel map that shows the locations of all devices relative to the threat location, danger zone and buffer area, as well as directions to an escape path or instructions to shelter in place. This site or parcel map is communicated to software application 160 on the mobile devices of protected users, first responders, security personnel, site staff, etc.

State Escalation—Device Management Component 200

Activation of IoT devices 100 and movement to an "awake" state and further escalating states occurs in multiple ways: (1) when device movement sensed by sensor 110 exceeds a pre-defined movement threshold for a pre-defined period of time; (2) when acceleration (gravitational acceleration or "g") sensed by sensor 110 exceeds a pre-defined "high g" parameter; (3) when the degrees of orientation sensed by sensor 110 exceeds a pre-defined orientation parameter for a pre-defined period of time; (4) when in-sight button 122 is pressed; and (5) when med-alert button or slide 124 is actuated. These "orchestrations" from an asleep state to an awake state are performed by device management component 200, as explained in more detail below.

(1) Activation by Movement

A first method by which IoT devices 100 move from an asleep state to an awake state and further escalating states is detection by sensor 110 of movement exceeding a pre-defined threshold of movement for a pre-determined period of time. The threshold of movement required to trigger detection of movement may be set by adjusting the sensitivity of the accelerometer of sensor 110, typically to a low, medium, or high setting, and is stored in component 200. In the description below, "detection of movement" means that movement sensed by sensor 110 exceeds the pre-defined threshold of movement stored in component 200.

Sensors 110 of IoT devices 100 continuously output sensed movement of IoT devices 100 to component 200. When detection of movement of a particular IoT device 100 occurs and continues for a period exceeding a pre-defined awake time, the state of the IoT device is changed to "awake" by component 200. When detection of movement of the IoT device continues for a period exceeding a pre-defined alert time, the state of the IoT device is escalated to "alert" by component 200. When detection of movement of the IoT device continues for a period exceeding a pre-defined alarm time, the state of the IoT device is escalated to "alarm" by component 200. In one implementation, the awake time is pre-defined as two seconds, the alert time is pre-defined as three seconds, and the alarm time is pre-defined as five seconds.

(2) Activation by High G

A second method by which IoT devices 100 move from an asleep state to an awake state and further escalating states is detection by sensor 110 of acceleration exceeding a pre-defined gravitational force "high g" acceleration that is stored in component 200. In one implementation, the "high g" acceleration is 0.5 g. In the description below, "detection of high g" means that acceleration sensed by sensor 110 exceeds the pre-defined high g.

Sensors 110 continuously output the sensed acceleration of IoT devices 100 to component 200. When detection of high g of a particular IoT device 100 occurs exceeding a high g awake trigger, the state of the IoT device is changed to "awake" by component 200. When detection of high g of the IoT device continues for a period exceeding a pre-defined alert time, the state of the IoT device is escalated to "alert" by component 200. When detection of high g of the IoT device continues for a period exceeding a pre-defined alarm time, the state of the IoT device is escalated to "alarm" by component 200. In one implementation, the awake time is pre-defined as two seconds, the alert time is pre-defined as three seconds, and the alarm time is pre-defined as five seconds.

(3) Activation by Change in Orientation

A third method by which IoT devices 100 move from an asleep state to an awake state and further escalating states is detection by sensor 110 of an orientation exceeding a pre-defined degree of orientation that continues for a pre-determined period of time. The pre-defined degree of orientation is stored in component 200 and, in one implementation, is 45 degrees. In the description below, "detection of orientation movement" means that sensor 110 senses an orientation movement that exceeds the pre-defined degree of orientation stored in component 200.

Sensors 110 of IoT devices 100 continuously output the sensed orientation of IoT devices 100 to component 200. When detection of orientation movement of a particular IoT device 100 occurs and continues for a duration exceeding a pre-defined awake time, the state of the IoT device is changed to "awake" by component 200. When detection of orientation movement of the IoT device continues for a duration exceeding a pre-defined alert time, the state of the IoT device is escalated to "alert" by component 200. When detection of orientation movement of the IoT device continues for a duration exceeding a pre-defined alarm time, the state of the IoT device is escalated to "alarm" by component 200. In one implementation, the awake time is pre-defined as one second, the alert time is pre-defined as 1.5 seconds, and the alarm time is pre-defined as two seconds.

(4) Activation by In-Sight Button

A fourth method by which IoT devices 100 may move from an asleep state to an awake and further escalated state is by pressing in-sight button 122. When in-sight button 122 is pressed, the state of the IoT device is escalated directly from "asleep" to "alarm".

(5) Activation by Med-Alert Slide Switch

A fifth method by which IoT devices 100 move from an asleep slate to an awake state and further escalating states is by operation of med-alert slide switch 124. In one implementation, upon any actuation of med-alert slide switch 124, the state of the IoT device is escalated directly from "asleep" to "alarm". Alternatively, there may be a gradual escalation of the state of the IoT device based on the duration of actuation of med-alert slide switch 124. For example, the state of the IoT device may be changed to: "awake" when med-alert slide switch 124 is actuated for a pre-defined awake time (one second, for example); to "alert" when med-alert slide switch 124 is actuated for a pre-defined alert time (1.5 seconds, for example); and to "alarm" when med-alert slide switch is actuated for a pre-defined alarm time (two seconds, for example).

The above-described methods by which the states of the IoT devices are gradually or abruptly escalated in seriousness are merely illustrative and are not limiting. Alternative methods of state escalation, as well as different and/or additional states of escalation, are envisioned and are within the scope of this invention.

Data Computation Component 300—Active Device Group and Sorting

Once device management component 200 has changed the state of any IoT device 100 from "asleep" to "awake" or higher, system 50 is activated. The change in state is communicated from component 200 to data computation component 300, and triggers component 300 to create active device group 320 which includes the IoT device 100 that triggered the event. The location of the initial device added to active device group 320 is used to calculate the threat location. After active device group 320 is triggered by an activated device, in one embodiment, subsequent devices are added to group 320 only by pressing in-sight button 122. In another embodiment, subsequent devices may be added to group 320 by escalation to a pre-defined state (i.e., "awake", "alert" or "alarm"). As will be described in detail below, GIS system 400 uses the geo-locations of the devices in active device group 320 as polygon points to calculate a threat center location, to define a danger zone around the threat location, and to define a buffer area around the danger zone.

A device that has been added to active device group 320 is designated an "active" or "activated" device. When a device is activated, data computation component 300 starts an "awake clock" for that device. The elapsed time that each device has been active is tracked and is referred to as its "on time count". The awake clock and "on time count" for a device restarts on each repeated press of the in-sight button. The devices in group 320 are sorted and prioritized by their "on time count", from shortest to longest, into an active device list 322.

A maximum number of devices on active device list 322 that can be used as polygon points to define the danger zone is pre-defined and stored in component 300. In one implementation, the maximum number of devices that are used as polygon points is eight. When more than the maximum number of devices are active, devices with the longest "on time counts" are dropped from use as polygon points that define the danger zone.

Devices are also dropped from use as polygon points when their "on time count" exceeds a "maximum on time count". In one implementation, the "maximum on time count" is ten seconds. Thus, devices that have been active for longer than the "maximum on time count" are no longer used as polygon points to define the danger zone. A minimum number at or below which devices are not dropped from use as polygon points is pre-defined and stored in component 300. In one implementation, this minimum number is three. Thus, when only three devices on list 322 remain available for use as polygon points due to the "on time count" of the other active devices on list 322 exceeding the maximum "on time count", those three devices remain available for use as polygon points regardless of the duration of their "on time count" (that is, until more devices are added to active device group 320, or until an "all clear" is given).

FIG. 7 is a table setting forth an exemplary active device list 322. There are twelve active devices in list 322 (column 3), with all but device 1 at the bottom of the list having been activated by an in-sight button press (column 2). As can be seen in column 4, the maximum "on time count" has been set to ten seconds. Column 5 sets forth the current "on time count" for each device, column 6 sets forth the "on time count" remaining for each device, and column 7 indicates whether there is any "on time" remaining. Devices 1 and 2 have an "on time" in excess of the maximum "on time", and thus are no longer used in polygon formation (see column 9—"In Polygon? Yes/No"). Moreover, as the maximum number of devices to be included in polygon formation is eight, the devices with the longest remaining on times—devices 3 and 11—have also been dropped from use in polygon formation. Thus, although there are twelve active devices, only the top eight devices with the most "on time" remaining are used in polygon formation. The total number of active devices related to the same incident with the in-sight button pressed is also used to evaluate the seriousness of the incident and/or to prioritize the incident response.

GIS Site Map Component 400—Site Map Formation

The information from active device list 322 is streamed (see 324 of FIG. 5) to GIS site map component 400. In addition, the information from all device list 310 is streamed (see 312 of FIG. 5) to GIS site map component 400. All device list 310 includes all data associated with each IoT device 100 in system 50. Data concerning the location of IoT devices 100 is included on all device list 310. This location data is generated by, for example, WIFI module 142, Bluetooth module 144, cellular module 146, GNSS module 148 and NFC module 149, and includes GPS (satellite) latitude/longitude and altitude; Wi-Fi latitude/longitude and altitude; and Bluetooth latitude/longitude and altitude. Sensor data from sensor 110, including movement, acceleration, and orientation data, is also included on all device list 310. State data for each device is also included in list 310, such as whether the device is active, and whether its in-sight button and/or med-alert slide have been actuated.

In one implementation, location data concerning the location of IoT devices 100 is supplemented by highly accurate positioning technologies, such as ultra-wide band (UWB) and/or Bluetooth technologies. In one non-limiting example, an indoor positioning system (IPS) is implemented using highly accurate positioning technologies such as ultra-wide band (UWB) and/or Bluetooth technologies. Ultra-wideband (UWB) is a radio technology that uses a very low energy level for short-range, high bandwidth communications over a large part of the radio spectrum. According to the present invention, UWB may be used for location determination and communication in addition to GPS, cellular, Wi-Fi and Bluetooth as previously described. UWB greatly improves the accuracy of indoor positioning, has better range, reduces latency, and reduces IoT device size. If UWB is not available, an IPS may alternatively be implemented using Bluetooth technology. When an IPS is provided, a seamless transition or bridge occurs to the more accurate IPS upon movement from outdoors to indoors, or vice-versa. If indoor positioning is not available, full system operation remains available through cellular, Wi-Fi and/or global positioning system (GPS).

In an IPS utilizing UWB, UWB anchors are used to connect with small badge sized IoT devices. In some implementations, such as in a disaster area use case (described below), geolocated, cellular-connected, battery powered gateways are used to power the UWB anchors with a power-over-ethernet (POE) connection (or any other suitable power connection) and for geolocation of the UWB anchors through physical attachment between the two devices.

Figure 20:
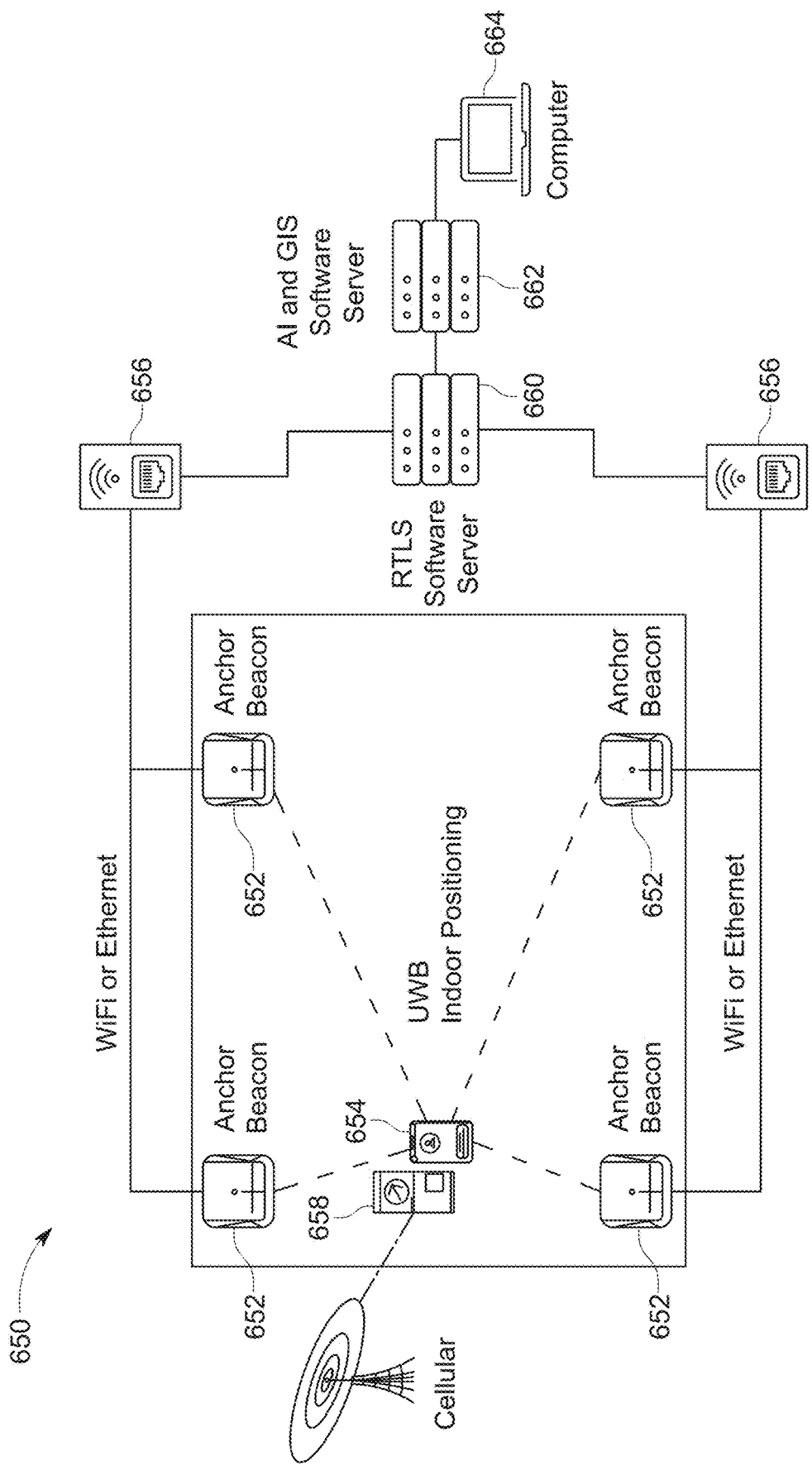
FIG. 20 is a diagram of an indoor positioning system (IPS) implemented with ultra-wide band (UWB) technology, according to the present invention.

FIG. 20 is a diagram of an IPS 650 implemented with UWB. IPS 650 includes a plurality of anchor beacons 652 that communicate via UWB with UWB badge sized IoT device ("badge device") 654. Badge device 654 is smaller and easier to carry than IoT devices 100 described herein and provides more accurate indoor communication and location determination via UWB. Anchor beacons 652, in turn, communicate the UWB location data of badge device 654 to gateways 656. In some implementations, communication between anchor beacons 652 and gateways 656 is via Wi-Fi or Ethernet. In other implementations, such as in the disaster area use case described below, gateways 656 are geolocated, cellular-connected, battery powered gateways that are used to power anchor beacons 652 via a power-over-ethernet (POE) physical connection, or any other suitable physical/power connection. Mobile device 658 (which may also be carried by a user) is capable of cellular communication/location determination as is shown in FIG. 20.

For non-limiting purposes of illustration, FIG. 20 depicts four anchor beacons 652, two gateways 656, one badge device 654 and one mobile device 658. This is merely one example, however, and IPS 650 may comprise other suitable numbers of anchor beacons and gateways, and other numbers of badge devices and mobile devices may be present within IPS 650. The anchors or beacons could also be placed quickly in an emergency to immediately improve system connectivity. The anchors or beacons could be quickly placed, for example, within a burning building during firefighting and rescue operations.

Gateways 656, in turn, communicate the UWB location data of badge device 654 received from anchor beacons 652 to real time location system (RTLS) software server 660. RTLS software server communicates the UWB location data to artificial intelligence (AI) and geographic information system (GIS) server 662, which may be accessed by computer 664.

Figure 21:
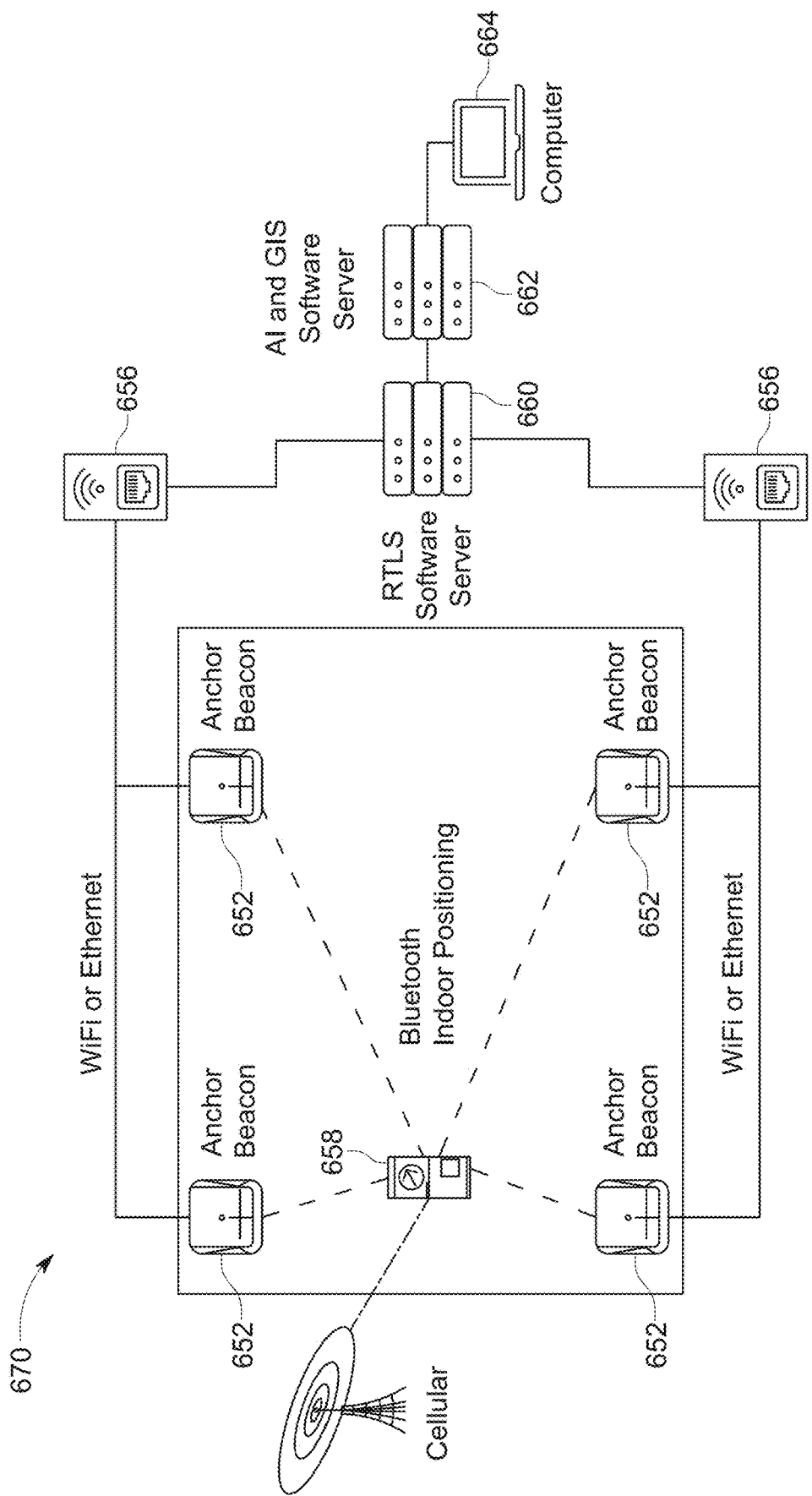
FIG. 21 is a diagram of an IPS implemented with Bluetooth technology, according to the present invention.

FIG. 21 is a diagram of an alternative IPS 670 implemented with Bluetooth technology rather than with UWB technology. IPS 670 does not utilize UWB badge devices 654. Instead, user mobile device 658 communicates with anchor beacons 652 via Bluetooth communication. IPS 670 is otherwise essentially the same as IPS 650.

A user profile is also included in the data for each IoT device, which impacts the mobile application and user interface that is provided to that user. If the geographic area served by system 50 is a school campus, for instance, the data and user interface transmitted to the mobile application of a staff member will be different from the data and user interface transmitted to the mobile application of security personnel.

User profiles may additionally be used for guest mobile applications for users not associated with an IoT Device. For example, a visitor to a campus or a student using a guest user profile can access basic alert notifications, arrow, and x guidance features. This may be enabled by a user with a simple campus selection or automatic campus detection based on a geo-fence.

Figure 8A:
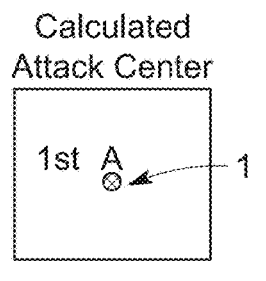
FIG. 8A is a diagram showing a threat location based on one active device, according to the present invention.
Figure 8B:
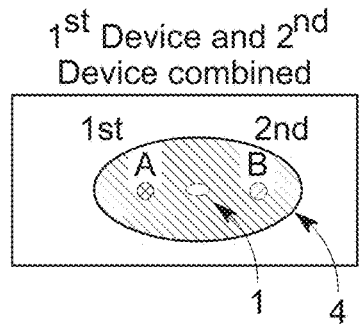
FIG. 8B is a diagram showing a threat location and danger zone based on two active devices, according to the present invention.
Figure 8C:
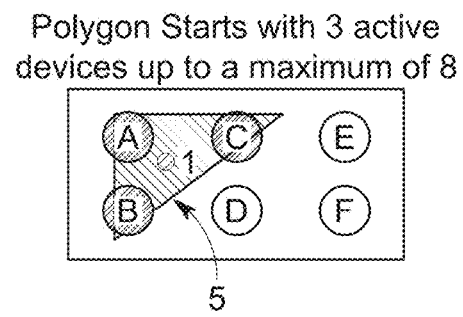
FIG. 8C is a diagram showing a threat location and danger zone based on three active devices, according to the present invention.

FIGS. 8A, 8B and 8C illustrate how GIS site map component 400 calculates and displays a threat location 1 based on data received from active IoT devices 100. When an initial device A becomes active, as shown in FIG. 8A, threat location 1 coincides with the location of device A. When a second device B becomes active by press of its in-sight button, as shown in FIG. 8B, a polyline 4 is formed around active devices A and B, and threat location 1 is calculated as the center of polyline 4. When a third device C becomes active, as shown in FIG. 8C, a polygon 5 is formed to encompass active devices A, B and C, and threat location 1 is calculated as the center of polygon 5. As additional devices become active, a polygon is formed to encompass all active devices, up to a maximum of eight devices.

Figure 9A:
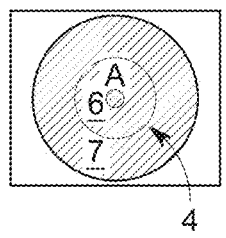
FIG. 9A is a diagram showing a threat location, danger zone and buffer area based on one active device, according to the present invention.
Figure 9B:
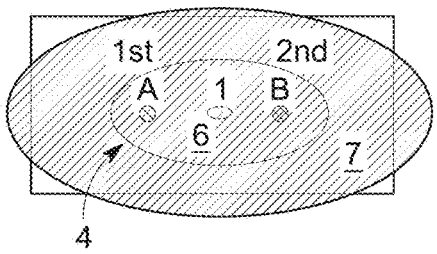
FIG. 9B is a diagram showing a threat location, danger zone and buffer area based on two active devices, according to the present invention.
Figure 9C:
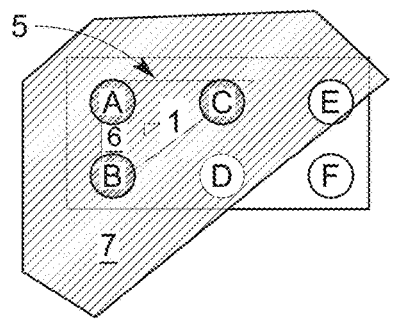
FIG. 9C is a diagram showing a threat location, danger zone and buffer area based on three active devices, according to the present invention.

As shown in FIGS. 9A-9C, the area encompassed by polyline 4 or polygon 5 and having threat location 1 as its center is designated as danger zone 6. When there is only one active device, a polyline 4 may encircle that device to define danger zone 6 (FIG. 9A). The area of danger zone 6 may be adjusted (made larger or smaller) by changing a pre-defined "radius of attack" setting. A buffer area 7 is defined around danger zone 6, with a size that may be made larger or smaller by changing a pre-defined "radius of attack buffer" setting.

The shapes and locations of danger zone 6 and buffer area 7 are dynamic and change in real time based on the number of active IoT devices and their locations. FIG. 9B shows two active devices A and B encircled by polyline 4 to define danger zone 6 and buffer area 7. FIG. 9C shows three active devices A, B and C used as polygon points to define danger zone 6 and buffer area 7. In FIG. 9C, two additional devices D and E are present in buffer area 7 and will have their alert states escalated based on their proximity to the threat location.

GIS site map component 400 changes the states of IoT devices 100 based on their proximity to the calculated threat location. For example, devices within the buffer area (within alarm proximity) have their alarm state enabled; devices within an alert proximity of the threat location have their alert state enabled; and devices within an awake proximity of the threat location have their awake state enabled. In one implementation, alarm proximity is 50 feet, alert proximity is 150 feet, and awake proximity is 200 feet. Appropriate audio, visual and vibration effects are generated by output device 130 based on the alarm, alert, or awake state of device 100.

GIS site map component 400 changes the states of IoT devices 100 based on their proximity to the calculated threat location. For example, devices within the buffer area (within alarm proximity) have their alarm state enabled; devices within an alert proximity of the threat location have their alert state enabled; and devices within an awake proximity of the threat location have their awake state enabled. In one implementation, alarm proximity is 50 feet, alert proximity is 150 feet, and awake proximity is 200 feet. Appropriate audio, visual, and vibration effects are generated by output device 130 based on the alarm, alert, or awake state of device 100.

Figure 10:
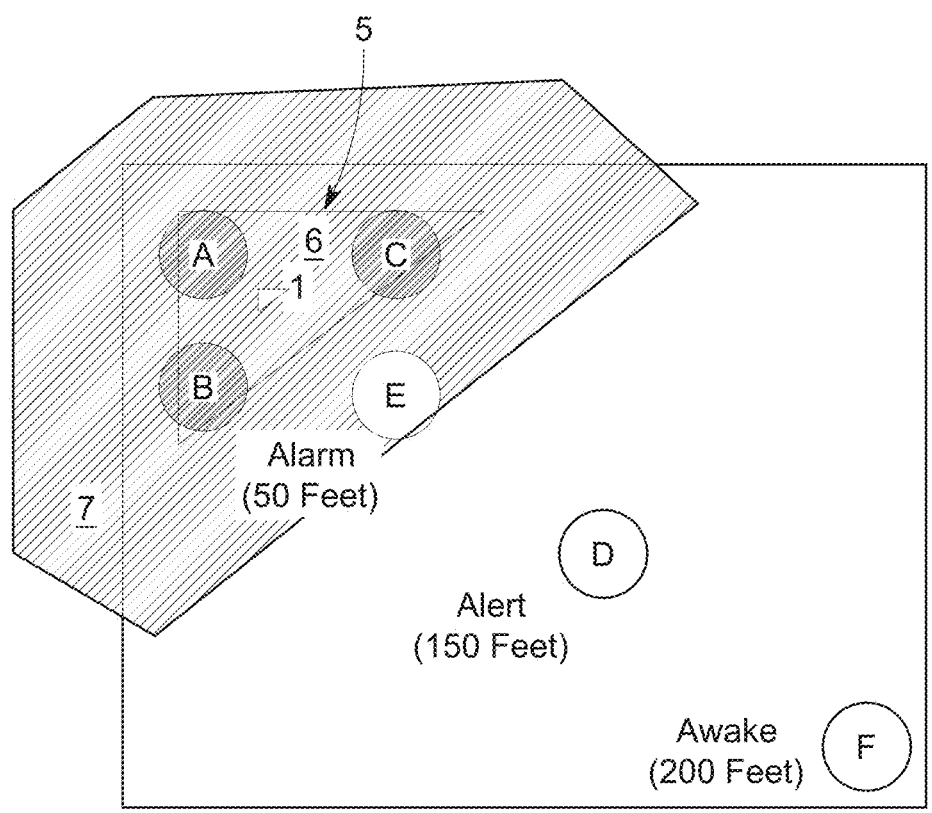
FIG. 10 is a diagram showing alarm, alert and awake IoT device states based on proximity to a calculated threat location, according to the present invention.

As shown in FIG. 10, for example, threat location 1, polygon 5, danger zone 6, and buffer area 7 are generated by component 400 based on the geo-locations of three active devices A, B and C. Three other devices D, E and F are near the incident, but are not yet in the active device group because their users have not pressed their in-sight buttons. Device E is within alarm proximity (50 feet) of the threat location; device D is within alert proximity (150 feet) of the threat location; and device F is within awake proximity (200 feet) of the threat location. Based on these proximities, component 400 enables the alarm state in device E, the alert state in device D, and the awake state in device F.

Figure 11:
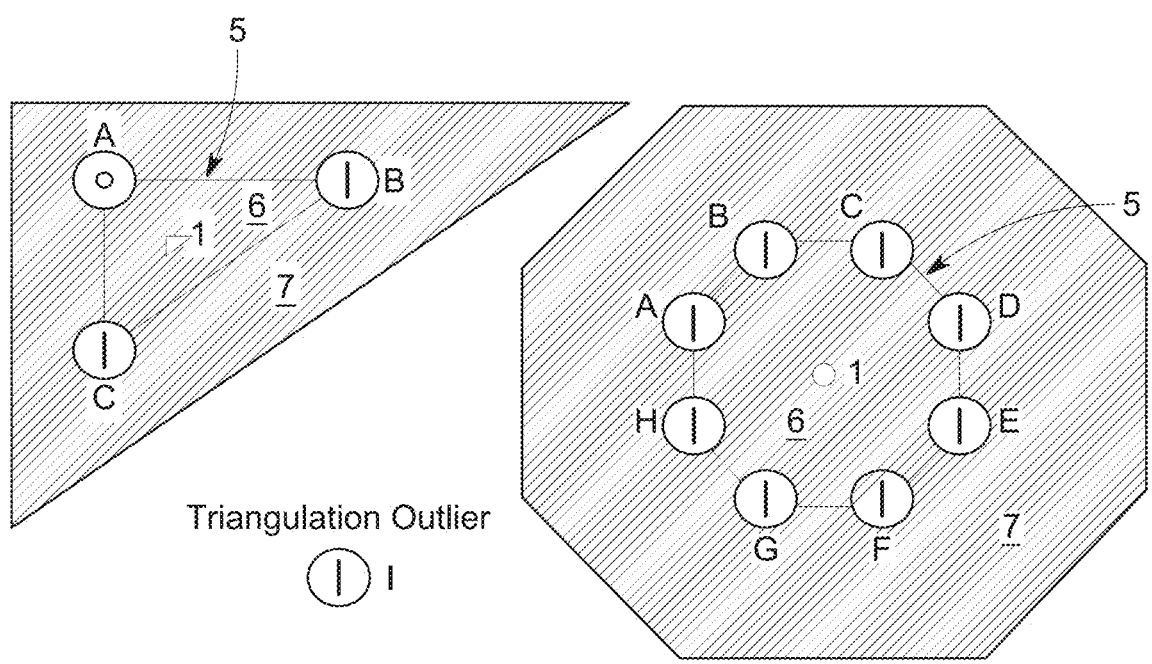
FIG. 11 illustrates danger zones and buffer areas defined by a lower polygon point count and by a higher polygon point count, according to the present invention.

FIG. 11 illustrates that the polygon point count (number of devices included in the polygon formation), and associated danger zone 6 and buffer area 7, grow larger based on in-sight button presses from additional devices (up to eight devices A-H), and grow smaller as device "on time counts" exceed the maximum "on time" count (down to three devices A-C). The polygon shape 5 varies based on the locations and numbers of active IoT devices (the points of the polygon). If the distance of an IoT device from the threat location exceeds a pre-set outlier distance (see device I in FIG. 11), that device I is dropped from use as a polygon point even if time remains in its "on time count".

Figure 12:
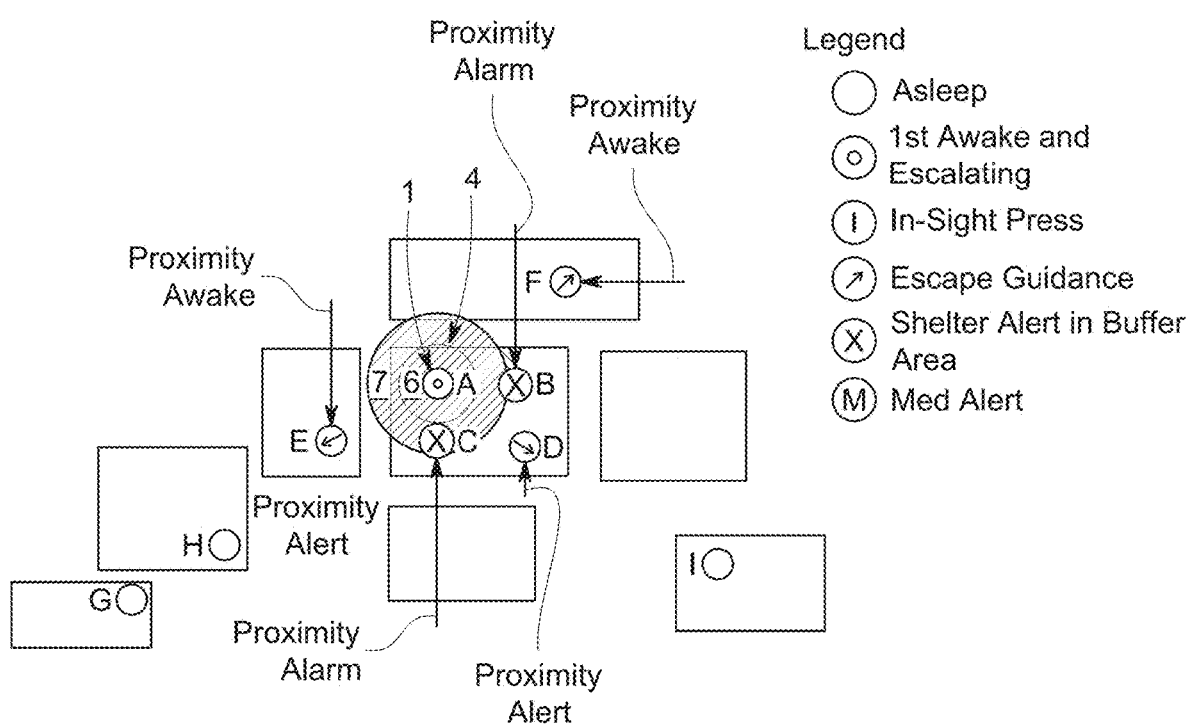
FIG. 12 is an example site map showing a plurality of IoT devices, with one device activated, according to the present invention.

FIG. 12 is an example site or parcel map showing a plurality of IoT devices. In FIG. 12, one device A has been awakened based by one of the methods described above, i.e., by movement, high g, orientation change, or by pressing the in-sight or med-alert button. The location of device A is established as threat location 1, and polyline 4 is formed around device A to define danger zone 6. As discussed above, the area of danger zone 6 is set by a pre-defined "radius of attack" setting. Buffer area 7 is defined around danger zone 6, having a size set by the pre-defined "radius of attack buffer" setting.

Devices B and C are within buffer area 7, and thus within alarm proximity, and have their states changed to "alarm". Device D is outside of buffer area 7 but within alert proximity, and has its state changed to "alert". Devices E and F are outside of buffer area 7 but within awake proximity, and have their states changed to "awake". Devices G, H and I are outside of awake proximity from threat location 1 and remain in "asleep" state.

This information generated by GIS site map component 400 is displayed in real time in mobile applications 160 on user devices such as phones, tablets, or computer browsers. FIGS. 13A and 13B depict mobile application 160 as displayed on a phone. The information displayed in mobile application 160 includes the device indicators, states, and locations relative to the threat location, the danger zone and buffer area. For devices outside of the buffer area but within alert or awake proximity (devices D, E, F), instructions or directions to an escape path may be displayed on mobile application 160 (such as a large green directional arrow pointing away from the threat location as shown in FIG. 13A). For devices within alarm proximity (within the buffer area) (devices A, B, C), instructions to hide or shelter in place may be displayed on mobile application 160 (such as a large red "X" as shown in FIG. 13B).

In one implementation, in addition to the IoT device, the user's mobile device on which the mobile application is displayed is geolocated and tracked when the system is active. On activation of the system, for example, the user's mobile device may communicate location data of the mobile device to server 302. The location data from the IoT device and the user's mobile device can be combined into a single, more accurate location of the user. User profiles are used on the mobile application to enable the invention to function in the home system and as a guest mobile application within other system areas serviced by the invention, therefore enabling use at multiple system locations. User profiles also are used to enable multi-system uses for first responders.

Figure 14:
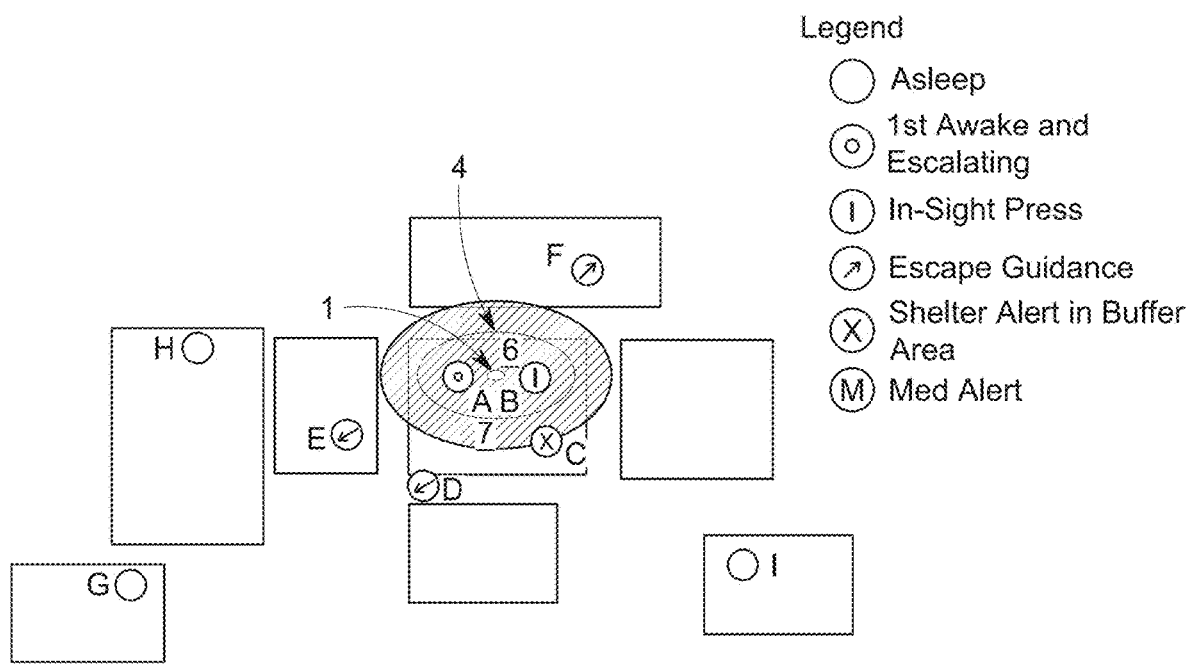
FIG. 14 is an example site map showing a plurality of IoT devices, with two devices activated, according to the present invention.

FIG. 14 shows the site or parcel map of FIG. 12, updated after further device and threat location movement has occurred. Device B has pressed its in-sight button, and therefore is placed on the active device list along with device A and has its state changed to "alarm". The locations of devices A and B are used to calculate threat location 1 and to form polyline 4 around devices A and B, thereby defining danger zone 6 and buffer area 7. Device C remains within buffer area 7, and thus remains in an "alarm" state with instructions to hide or shelter in place ("X") displayed on the mobile application. Device D has moved outside of buffer area 7 but is within alert proximity, and thus has its state changed to "alert". Devices E and F remain outside of buffer area 7 but within awake proximity, and their states remain as "awake". Appropriate directional guidance (i.e., a directional arrow pointing away from the threat location) is displayed on the mobile application of devices D, E and F. Devices G, H and I are still outside of awake proximity from threat location 1 and remain in "asleep" state.

Figure 15:
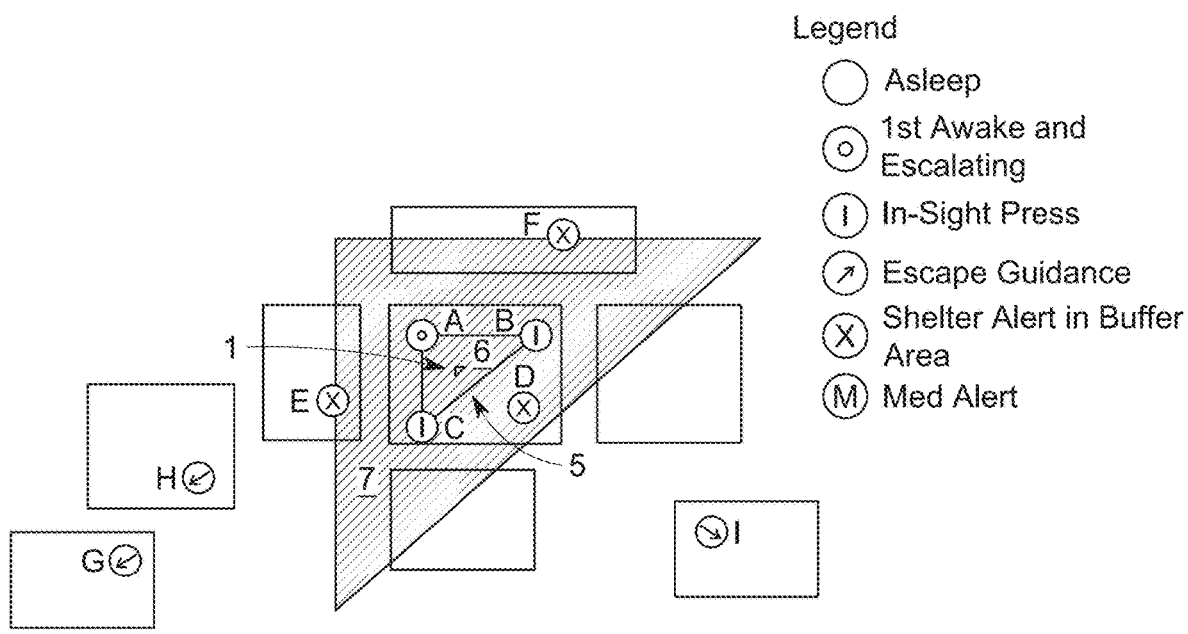
FIG. 15 is an example site map showing a plurality of IoT devices, with three devices activated, according to the present invention.

FIG. 15 shows the site or parcel map after further device and threat location movement has occurred. Devices B and C have now pressed their in-sight buttons. Thus, devices A, B and C are now on the active device list and are used as points in polygon 5 to establish threat location 1 and to define an expanded danger zone 6 and buffer area 7. Devices D, E and F are now within buffer area 7, and thus are in an "alarm" state with instructions to hide or shelter in place ("X") displayed on the mobile application. Devices G, H and I are now within awake proximity, and have their states changed to "awake" with appropriate directional guidance (i.e., a directional arrow pointing away from the threat location) displayed on the mobile application.

Figure 16:
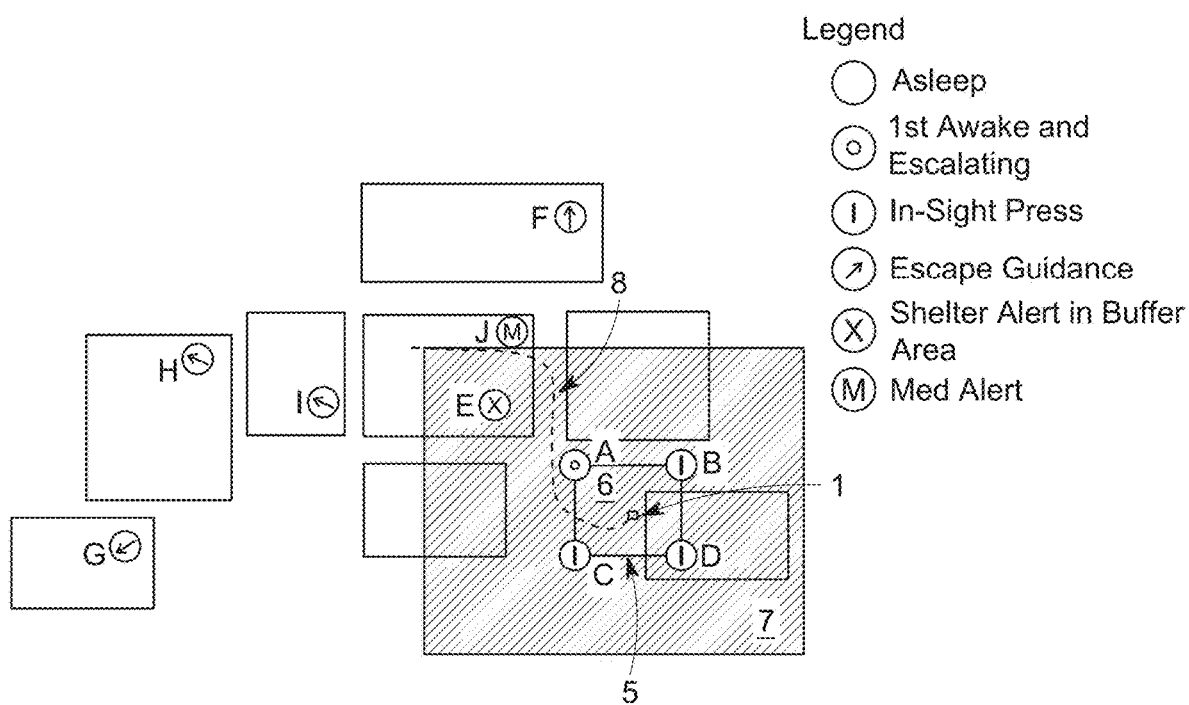
FIG. 16 is an example site map showing a plurality of IoT devices, with four devices activated, according to the present invention.

FIG. 16 shows the site or parcel map after still further device and threat location movement. Devices B, C and D have now pressed their in-sight buttons. Thus, devices A, B, C and D are now on the active device list and are used as points in polygon 5 to establish threat location 1 and to define an expanded danger zone 6 and buffer area 7. Device E is within buffer area 7 and is placed in an "alarm" state with instructions to hide or shelter in place ("X") displayed on the mobile application. Devices F, G, H and I are now within awake proximity, and have their states changed to "awake" with appropriate directional guidance (i.e., a directional arrow pointing away from the threat location) displayed on the mobile application.

In FIG. 16, an additional device has been added to the points of polygon 5, and the locations of the active reporting devices have moved, causing a change in shape, size, and location of danger zone 6 and buffer area 7. Threat location 1 is also changed, and a breadcrumb trail 8 is provided on the display to show movement from the previous threat location to the new threat location. Also in FIG. 16, an additional device J is present and has actuated its med-alert slide switch. This causes a notification to be transmitted to appropriate medical personnel for immediate medical response, as well as for device J to be placed in an alarm state.

Figure 22:
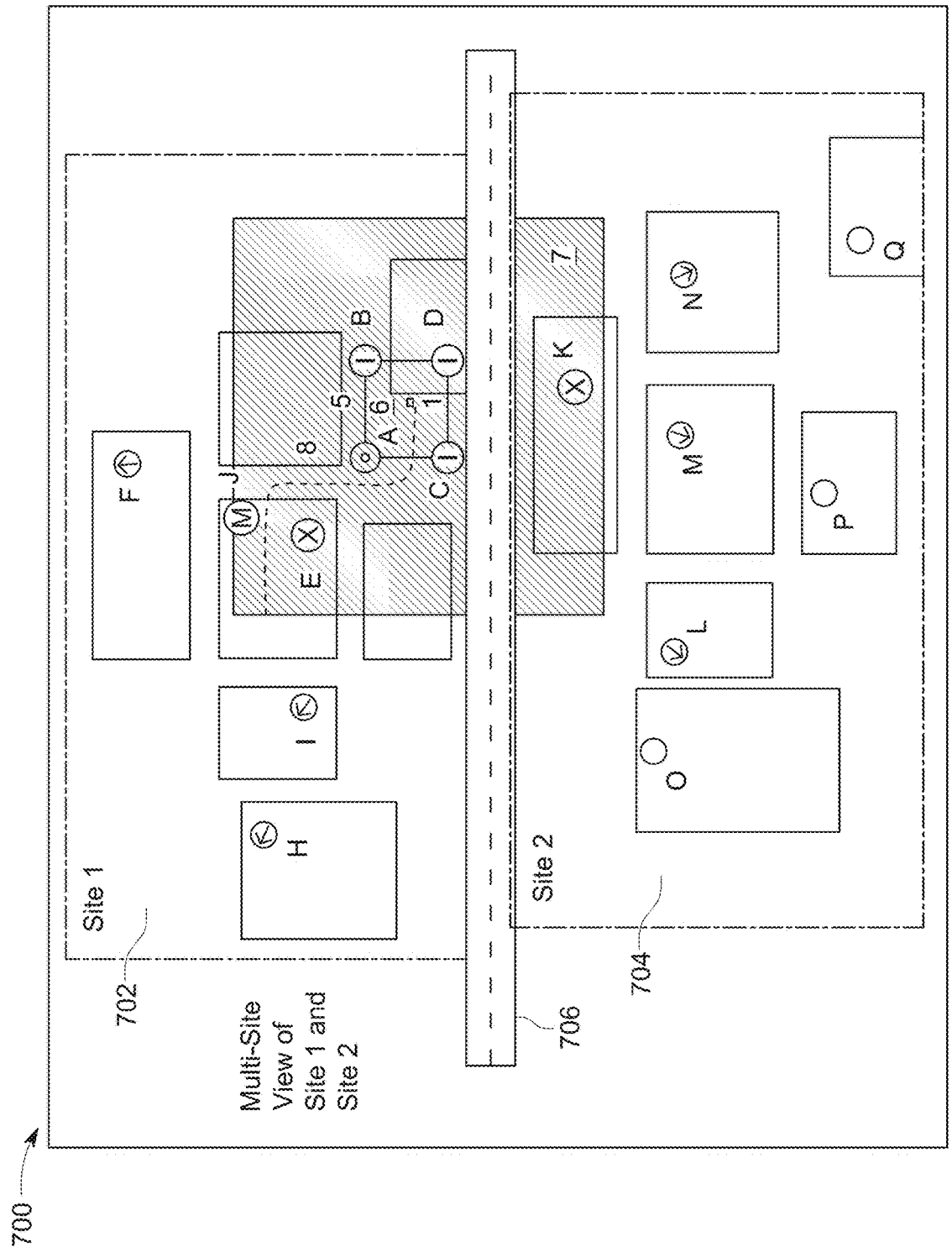
FIG. 22 is an example site map in a multi-site alert system, according to the present invention.

According to the present invention, multi-site alerts may be provided to adjacent and nearby sites and/or parcels. FIG. 22 is a site or parcel map 700 showing an example of a multi-site alert system including adjacent sites 702 and 704. Sites 702 and 704 may be directly adjacent or may be separated by a barrier such as road 706 as shown in FIG. 22.

Site 702 is essentially in the alert/incident state of FIG. 16. Devices A, B, C and D are on the active device list and are used as points in polygon 5 to establish threat location 1 and to define danger zone 6 and buffer area 7. Device E is within buffer area 7 and is in an "alarm" state with instructions to hide or shelter in place ("X") displayed on the mobile application. Devices F, H and I are in an "awake" state with appropriate directional guidance (i.e., a directional arrow pointing away from the threat location) displayed on the mobile application. Breadcrumb trail 8 shows movement from the previous threat location to current threat location 1. Device J has actuated its med-alert slide switch.

Site 704, adjacent to site 702, is alerted of the ongoing incident in site 702 via a "Multi-Site Proximity Alert". The security team in site 704 receives the multi-site alert and has the option to accept or not accept the alert. Alternatively, the multi-site alert may be received from an area-wide emergency manager that selects at-risk sites and sends out multi-site alerts. On acceptance, the threat location center 1, active devices A-J and buffer area 7 appear as a multi-site view in the system of site 704. The system of site 704 then operates as if the incident was in site 704.

As can be seen in FIG. 22, buffer area 7 has extended into site 704. The security team of site 704 has control of the buffer area 7 on the multi-site view that appears on the site 704 mobile application. The IoT devices in site 704 are alerted based on the proximity settings of site 704. Device K in site 704 is within buffer area 7 and is placed in an "alarm" state with instructions to hide or shelter in place ("X") displayed on the mobile application. Devices L, M and N are within awake proximity and have their states changed to "awake" with appropriate directional guidance (i.e., a directional arrow pointing away from the threat location) displayed on the mobile application. Devices O, P and Q are still outside of awake proximity from threat location 1 and remain in an "asleep" state.

Many smart phones include a compass-heading data field that may be used to enhance the accuracy of a calculated threat location. If the smart phone camera or video is on (likely pointed at the threat), the compass-heading data field is captured at regular time intervals and at the time that the in-sight button is pressed. In law enforcement operations, the IoT device could be physically connected to a body camera to capture the compass heading (camera orientation) at regular time intervals when the camera video is on. Knowing the direction of the threat relative to the user further enhances the accuracy of the threat location, particularly when multiple incidents are occurring at the same time.

Figure 23A:
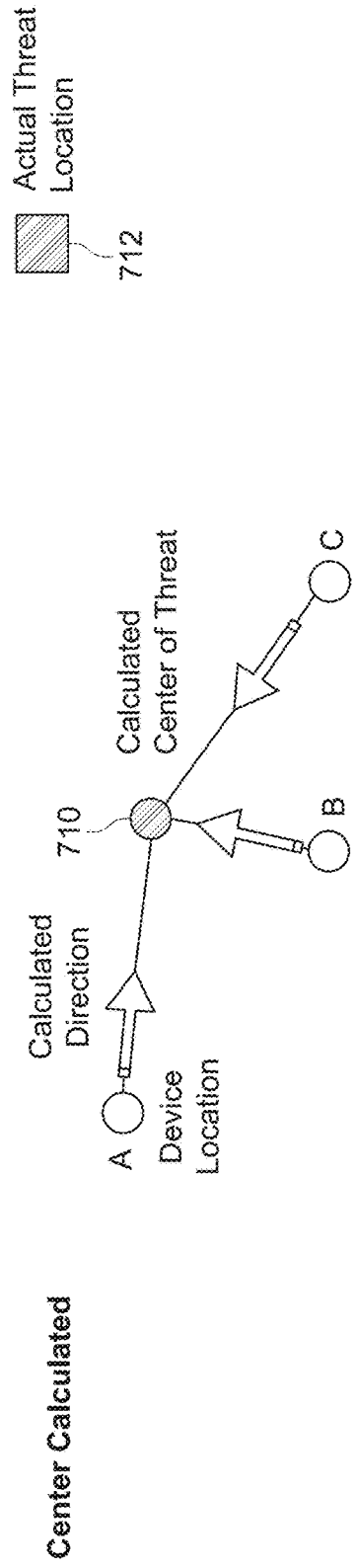
FIG. 23A is a diagram showing a calculated center of threat relative to an actual threat location without use of a smart phone compass heading, according to the present invention.
Figure 23B:
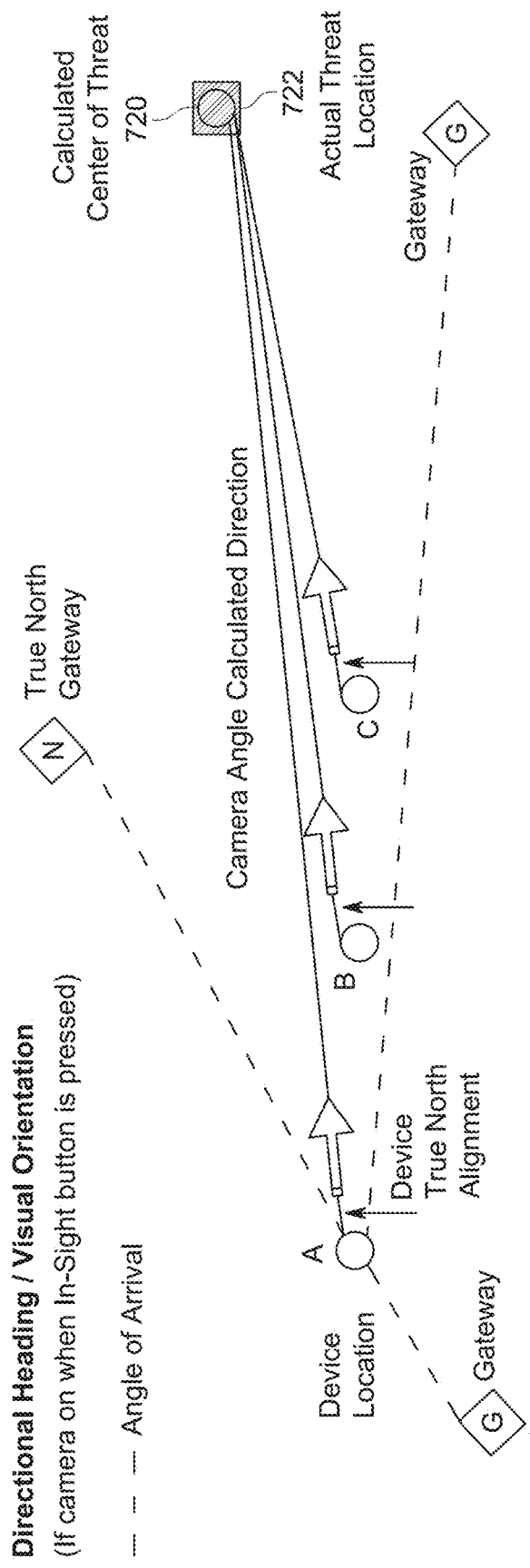
FIG. 23B is a diagram showing a calculated center of threat relative to an actual threat location with use of a smart phone compass heading, including enhanced IoT device magnetometer and north directional transmitting anchors and/or gateways and support software further improving accuracy, according to the present invention.

FIGS. 23A and 23B are diagrams illustrating how the smart phone compass heading (camera orientation) enhances the accuracy of the calculated center of threat. FIG. 23A shows the calculated center of threat 710 relative to the actual threat location 712 without use of the smart phone compass heading. Based on location data only from IoT devices A, B and C in the proximity of a threat, the calculated center of threat 710 may not correspond with the actual threat location 712, as can be seen in FIG. 23A.

FIG. 23B shows the calculated center of threat 720 relative to the actual threat location 722 with use of the smart phone compass heading. When directions in which the smart phones of the users of IoT devices A, B and C are pointing (compass headings) are considered along with the locations of devices A, B and C, the calculated center of threat 720 is much more accurate relative to the actual threat location 722. FIG. 23B shows the enhanced accuracy of the compass magnetometer using north sensing devices A, B and C hardware and the use of north directional transmitting anchors and/or gateways N and G.

As an alternative to, or in addition to, use of the smart phone's compass heading, wearable IoT glasses may also provide the visual orientation of the user, which may be used to determine the direction of the threat relative to the user. A compass-heading data field of the wearable IoT glasses may provide a visual orientation of the user that is used to determine a direction of the threat relative to the user.

Parenthetical devices may also be used, such as a small flexible plastic strip that fits into the head band of a hat or wraps around the back of the user's head from ear to ear. Electronics in the band indicate the orientation of the user's head and direction of vision. Parenthetical devices such as plastic strips with electronics may also be placed in the user's shoes to indicate the front and back orientation of the user's feet. Wearable IoT glasses and/or parenthetical devices such as plastic strips provide added information about the user's orientation relative to the threat that improve calculation of the threat location.

Another aspect of the invention is a multiple device merge. A single user can have multiple IoT devices such as phones, watches, real time location system (RTLS) devices, etc. During an incident, the invention prioritizes the primary device for system data inputs and if the devices are separated both devices are tracked. For instance, if two associated devices are more than 50 feet (or any other chosen distance) apart, they are considered as separate devices and tracked separately. If the two associated devices are less than 50 feet apart, the location of the primary device is prioritized and used as the "merged image location".

Another aspect of the invention is an alternative to first responders regularly pressing the in-sight button. Command centers may set a responder's device to continuous in-sight, allowing system inputs without manual user input. Alternatively, or in addition, there may be a verbal in-sight option where a microphone call from the responder is made to a command center and the command center enters the in-sight data.

The system of the present invention, as described above, receives multiple inputs from multiple people and possibly multiple sites or parcels involved in a threat or medical incident. These inputs are stored and used by artificial intelligence (AI) algorithms to ensure the most relevant inputs based on time and locations are used to predict the threat location and to send notifications. Such AI algorithms may be implemented, for example, by AI and GIS software server 662 of FIGS. 20 and 21.

There are generally four types of AI: (1) reactive machines; (2) limited memory; (3) theory of mind; and (4) self-awareness. The present invention, in one implementation, uses limited memory AI. Limited memory AI can store previous data and predictions when gathering information and weighing potential decisions—essentially looking into the past for clues on what may come next. Limited memory AI is more complex and presents greater possibilities than reactive machines.

Limited memory AI is created when a team continuously trains a model in how to analyze and utilize new data or an AI environment is built so models can be automatically trained and renewed. Six steps are followed when utilizing limited memory AI in machine learning: (1) training data is created; (2) a machine learning model is created; (3) the model makes predictions; (4) the model receives human or environmental feedback; (5) the feedback is stored as data; and (6) these steps are reiterated as a cycle.

There are three primary machine learning models that utilize limited memory AI: (1) reinforcement learning, which learns to make better predictions through repeated trial-and-error; (2) long short term memory (LSTM), which utilizes past data to help predict the next item in a sequence and views more recent information as most important when making predictions and discounts data from further in the past, though still utilizing it to form conclusions; and (3) evolutionary generative adversarial networks (E-GANs), which evolve over time, growing to explore slightly modified paths based off of previous experiences with every new decision. The E-GAN model is constantly in pursuit of a better path and utilizes simulations and statistics, or chance, to predict outcomes throughout its evolutionary mutation cycle.

In one implementation, the present invention employs limited memory AI. Multiple inputs from multiple people involved in a threat or medical incident are stored in long short-term memory (LSTM) for use during the incident and AI algorithms are used to ensure the most relevant inputs based on time and locations are used to predict the threat location and to send notifications. AI outputs improve over time and are fed back to those involved in the incident, others in the proximity of the incident, and stakeholders. Directional guidance and situational awareness are provided in real time based on predictive outcomes throughout the incident evolutionary mutation cycle, utilizing E-GANs. Incidents run for a period and can be reset back to dormant and reinitiated as the need arises, and multiple incidents can be managed simultaneously. Past incident cycles are stored for post incident analysis, iterative system enhancements, and personnel training.

Figure 17:
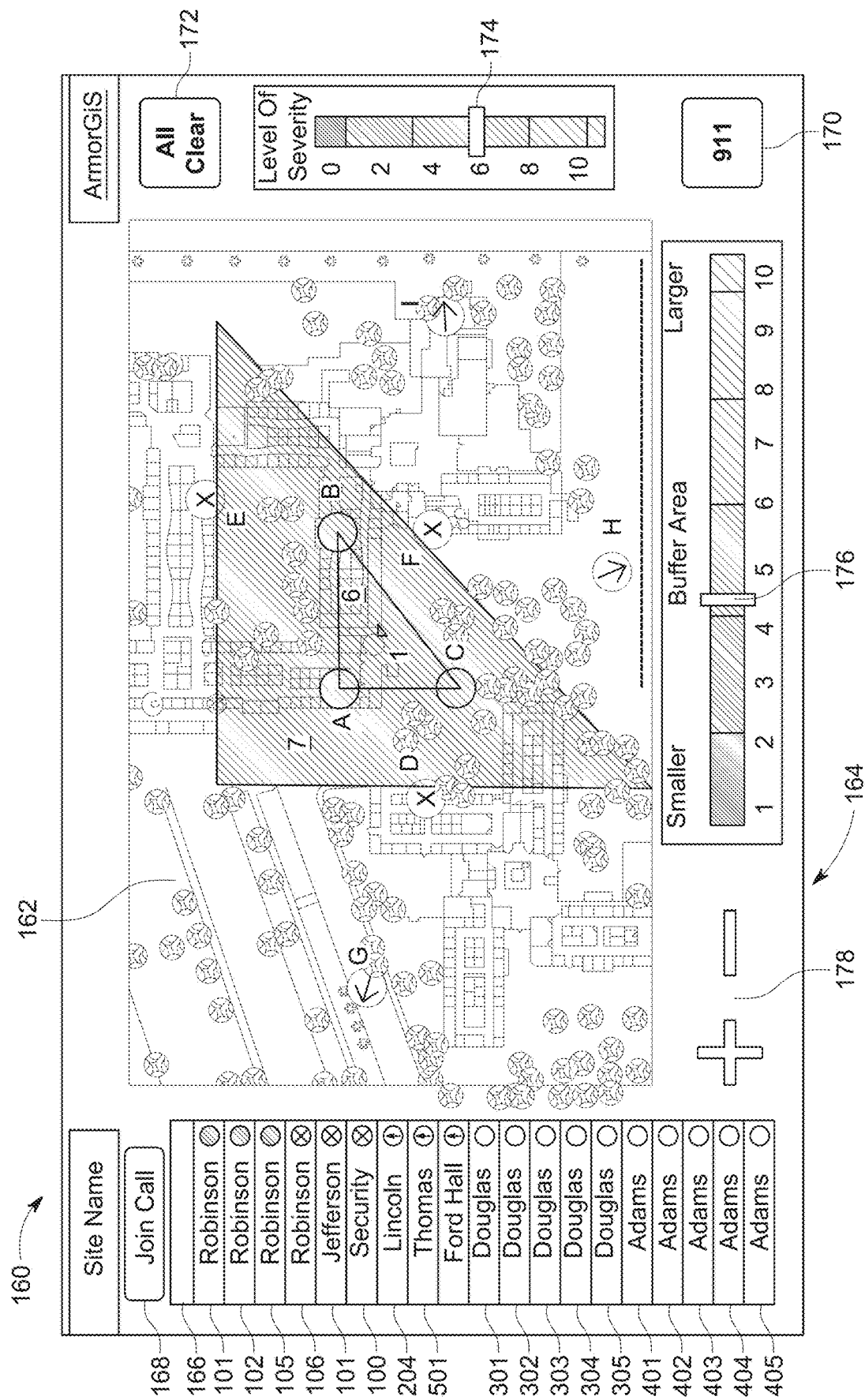
FIG. 17 is a screen shot of a mobile application, according to the present invention.

FIG. 17 is a screen shot of mobile application 160, which may be displayed in a computer browser, or on a user device such as a phone or tablet. Mobile application 160 displays GIS information as described above and facilitates user interaction with the GIS system and with third-party systems such as 911. As can be seen in FIG. 17, mobile application 160 presents a site or parcel map 162, which may be 2D or 3D. As device states change, their corresponding indicators change and move on site or parcel map 162 in real-time. For example, if the device is "asleep" the indicator for a device may be green, if the system is "awakened" due to a threat the indicator for a device may be red, and if urgent medical care is needed the indicator for a device may be blue.

Site or parcel map 162 is surrounded in mobile application 160 by tool perimeter 164. Mobile application 160 of FIG. 17 presents a robust user interface, with tool perimeter 164 including tools appropriate to user profiles such as, for example, site staff, security personnel and/or first responders. For other user profiles such as, for example, students, congregation, etc., mobile application 160 may present a simplified user interface without tool perimeter 164. For instance, the IoT device "badge" user interface appearance (FIG. 4: in-sight button 122 and med-assist slide switch 124) may be displayed on the user's mobile device.

Another aspect of the invention is the option to alert nearby emergency contacts or friends from a pre-chosen list of emergency contacts or friends in the event of a threat or medical alert. This feature may be provided by mobile application 160, or by a separate mobile application. In the event of a threat or medical alert, emergency contacts or friends designated as "Rescue Friends" are alerted if they are nearby, and the location of the person in need is shown anywhere in the world. Rescue Friends may be chosen from the contact list of a mobile device during setup, and a text or other communication is sent to the selected Rescue Friend informing them that they have been selected as a Rescue Friend for the requesting individual along with instructions for downloading the application.

If help is needed and the selected Rescue Friend is nearby, the mobile application will display the rescue location to the Rescue Friend. In addition, the Rescue Friend's mobile device may be used to increase the threat level of severity, thereby alerting other responders, and/or to place a call to a 911 center and share the location of the friend in need with the 911 center covering the rescue location. In one implementation, if the Rescue Friend does not select All Clear within a pre-defined period, such as three minutes, a 911 call is placed from the victim's phone and the victim's location is shared with the 911 center. In another implementation, the victim and/or responders can press the "Call 911" button, confirm, and the call is made to the 911 center covering the rescue location.

For violent threats, the threat location, danger zone and buffer area are determined and incorporated into site or parcel map 162 as described above. Within site or parcel map 162, in the example shown in FIG. 17, three IoT devices A, B and C are active and used as polygon points to define threat location 1 and danger zone 6. Buffer area 7 is formed around danger zone 6. IoT devices D, E and F intersect buffer area 7, and thus are moved to an alarm state with a large red "X" indication being overlaid on their icons to indicate that those devices are in an alarm state and have been instructed to hide or shelter in place. Devices G, H and I are outside of buffer area 7 and, depending on their proximity from threat location 1, are placed in either an alert or an awake state, with a directional green arrow indication being overlaid on their icons to indicate that those devices are in an alert or an awake state and have been provided with directional guidance away from threat location 1. Based on the threat location, the indicators may change from a directional escape arrow to a shelter-in-place "X", and vice-versa. As the threat moves through the site, breadcrumb indications are provided to follow the moving location of the threat, and the state of the devices change as they enter and exit the threat buffer area.

In the example of FIG. 17, a list 166 of IoT devices in the system is provided on the left side of tool perimeter 164, along with icons showing the current states of the active devices (i.e., alarm, alert, awake or asleep). "Join Call" button 168 is provided on the top left side of tool perimeter 164 to provide the option to join a security team call. "Call 911" button 170 is provided at the bottom right side of tool perimeter 164 to place a call to the local 911 center from a local or remote location. "All Clear" button 172 is provided at the top right side of tool perimeter 164 to end an incident and return all devices to an "asleep" state. As described previously, "all clear" button 172 requires an enhanced level of password/security to operate, such as two-level security authorization passwords. When an IoT device is used by a first responder, different icons for the IoT device may be used to indicate the type of first responder. For example, different IoT device icons may distinguish between law enforcement, medical and fire rescue personnel.

Level of severity slider 174 is provided on the right side of perimeter 164 so that users with appropriate permission/profile can indicate the severity of the incident. Buffer area slider 176 is provided at the bottom of perimeter 164 so that users with appropriate permission/profile can increase or decrease the buffer area surrounding the danger zone. Zoom buttons 178 are provided to zoom site or parcel map 162 in and out.

As noted above, the tools provided in tool perimeter 164 may vary depending on the user profile. An on-site teacher, for example, may have different tools available to them in tool perimeter 164 than does a first responder. For some user profiles, only site or parcel map 162 may be shown and tool perimeter 164 may be omitted completely. Moreover, different user profiles may be activated or notified based on threat level. For example, when any device goes to an "awake" state, on-site personnel or staff may be notified and their mobile application 160 activated. When any device goes to an "alert" state, the manager or supervisor of the site or parcel may be notified. When any device goes to an "alarm" state, local police may be notified. On manual button press, such as in-sight button 122 or med-alert slide switch 124 the state may go to "alarm", and the press of the 911 Call button may place a call to the local 911 center.

In the instance of a guest mobile application, the user interface may optionally include a cautionary "unsafe" input button. The "unsafe" button may be used by guests while in a protected site if they are in a situation in which they feel unsafe. For example, if a guest user enters a shopping mall that is protected by the system and notices or feels they are being followed by a suspicious character, they may press the "unsafe" button. On pressing the "unsafe" button, the guest's mobile device sends the geolocation of the device to server 302 and an alert can be sent, for example, to an on-site first responder.

In addition to maintaining individual device alert states and notifications, overall status of system 50 may also be maintained and cycle in stages. For example, the overall status of system 50 may cycle as follows: (1) all clear; (2) active; (3) 911; (4) standby all clear; and (6) back to all clear. Mobile application 160 is used by those being protected and is also shared externally with first responders, enabling a precise response to the location of the threat or medical need. For security teams there is a joint call option for on-site and remote users. Upon system activation, a call may be placed to the IoT devices in system 50 to allow the security team to have a conversation and coordinate the response while viewing mobile application 160, which could lead to a choice to call to 911.

Figure 24:
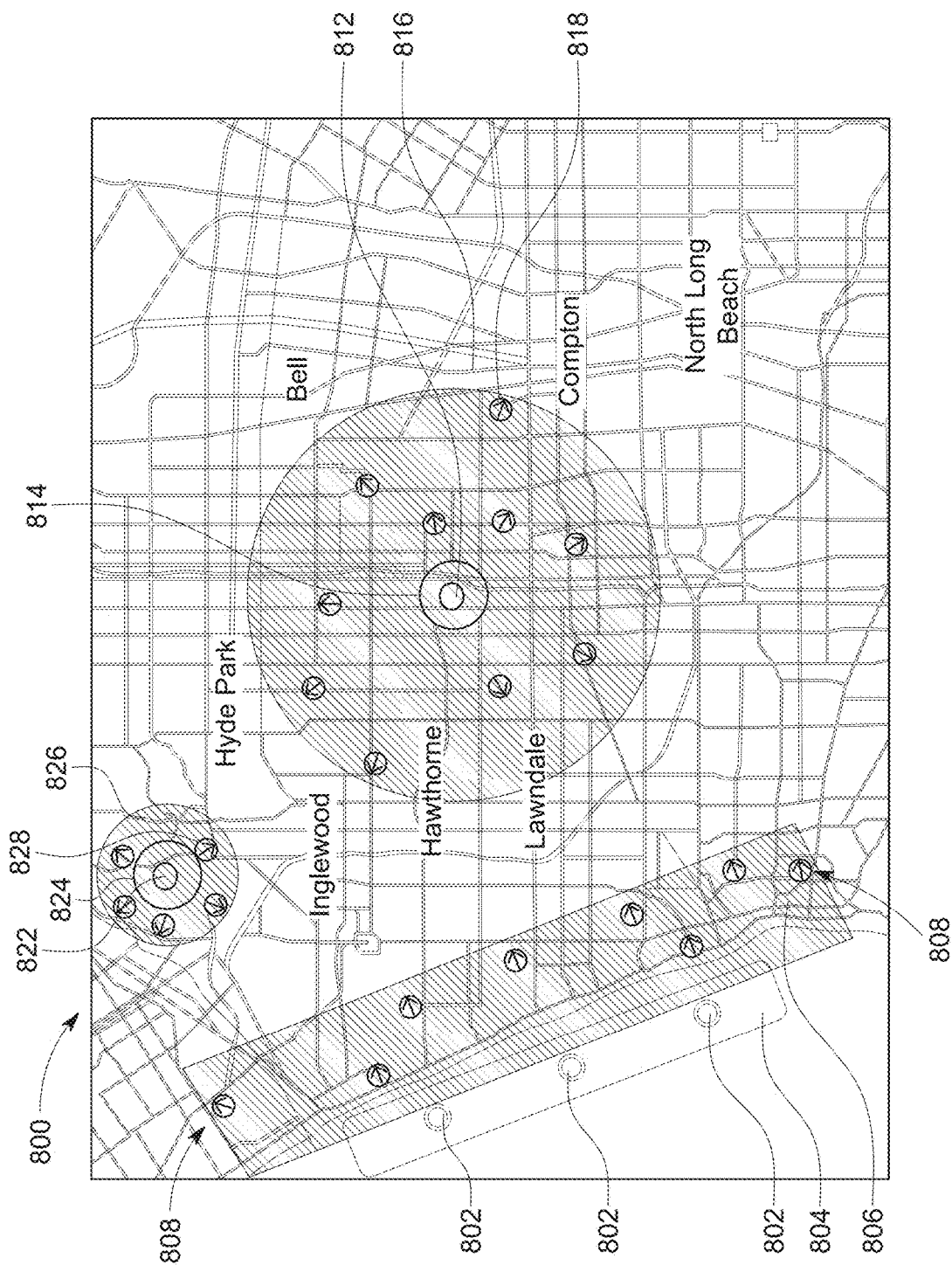
FIG. 24 is a screen shot of an emergency management center interface, according to the present invention.

FIG. 24 is a screen shot of an emergency management center interface 800, according to the present invention. Authorities can define areas and send intelligent alerts with instructions so informative and simplistic that lives can be saved. The ability to send evacuate or shelter in place alerts and to receive on-scene intelligence is provided. As can be seen in FIG. 24, authorities choose the emergency description and location, the size and shape of the area to alert, and guidance to escape or shelter in place. If escape is chosen, the users within the area receive a notification of the emergency and directions (i.e., an arrow) pointing them away from danger. If shelter in place is chosen, the users within the area receive a notification of the emergency and directions to shelter in place (i.e., an "X" is displayed on their mobile phone).

FIG. 24 shows various examples of area alerts that may be provided by emergency management center interface 800. An area alert for a tsunami, for example, may be provided, with tsunami threat locations 802 being used to define a tsunami threat area 804 and a tsunami buffer area 806. As can be seen by user escape icons 808, users within tsunami buffer area 806 are provided with directions to escape. An area alert for a bomb threat may also be provided, with bomb threat location 812 being used to define a bomb threat area 814 and a bomb threat buffer area 816. As can be seen by user escape icons 818, users within bomb threat buffer area 816 are provided with directions to escape. An area alert for a wildfire may also be provided, with wildfire threat location 822 being used to define a wildfire threat area 824 and a wildfire threat buffer area 826. As can be seen by user escape icons 828, users within wildfire threat buffer area 826 are provided with directions to escape.

Figure 25A:
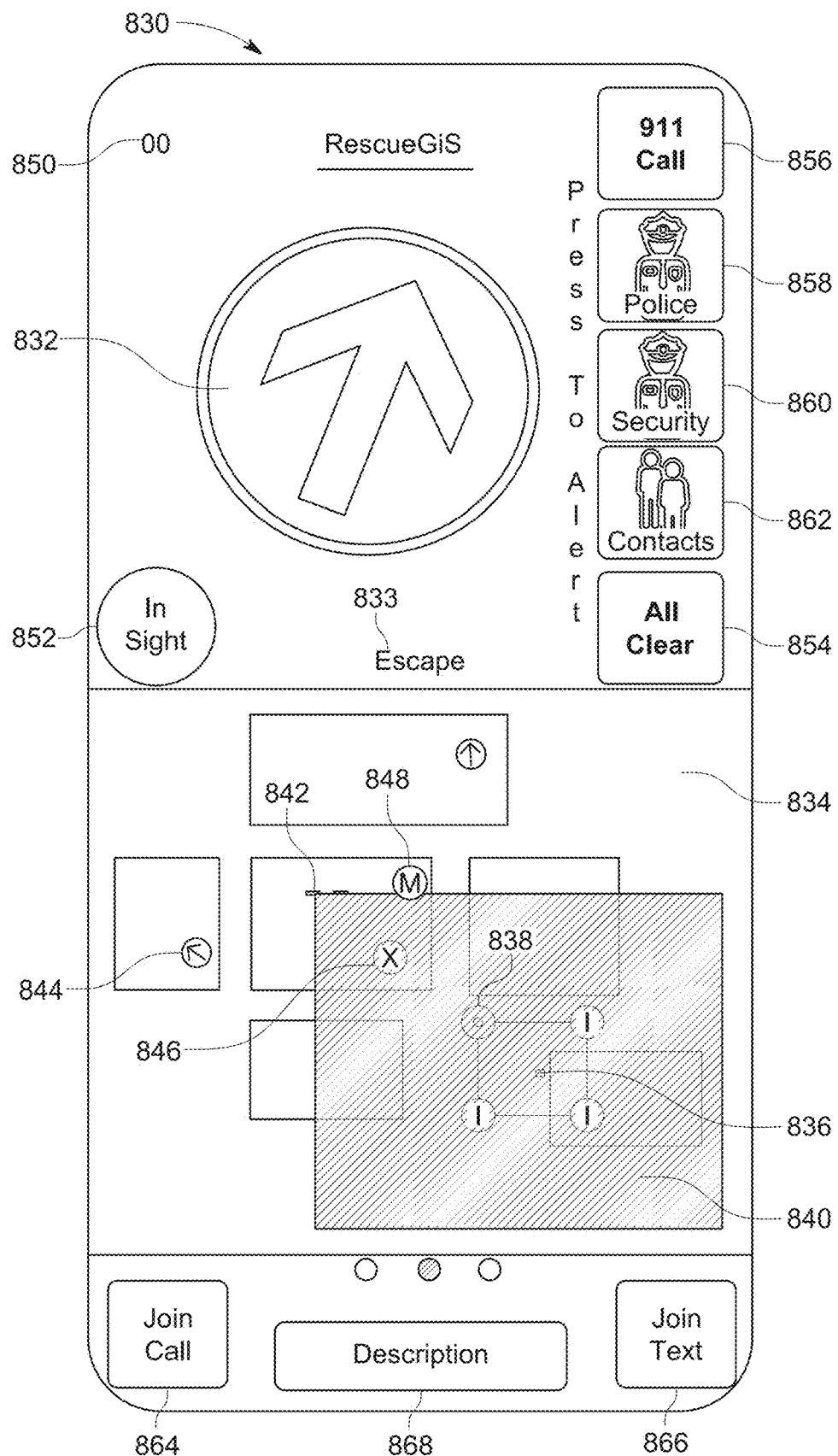
FIG. 25A is a screen shot of a user mobile phone application, with escape directions, according to the present invention.

FIG. 25A is a screen shot of a user mobile phone application 830, with escape directions such as directional arrow 832, according to the present invention. In addition to directional arrow 832, application 830 may provide text instructions 833 such as "Escape". As can be seen in FIG. 25A, mobile phone application 830 displays a location map 834, with threat location 836, threat area 838, threat buffer area 840, and threat breadcrumb path 842 being defined. Icons representing other users in the vicinity of location map 834 and the directions provided to them are displayed, including user escape icon 844, user shelter-hide icon 846 and user medical need icon 848.

User mobile phone application 830 provides various additional information, options, and inputs. These include: incident countdown 850 is displayed, in-sight alert button 852, all clear button 854, 911 call button 856, contact local police button 858, contact on-site security button 860, contact rescue contacts button 862, join call button 864, join text button 866 and text description button 868.

Figure 25B:
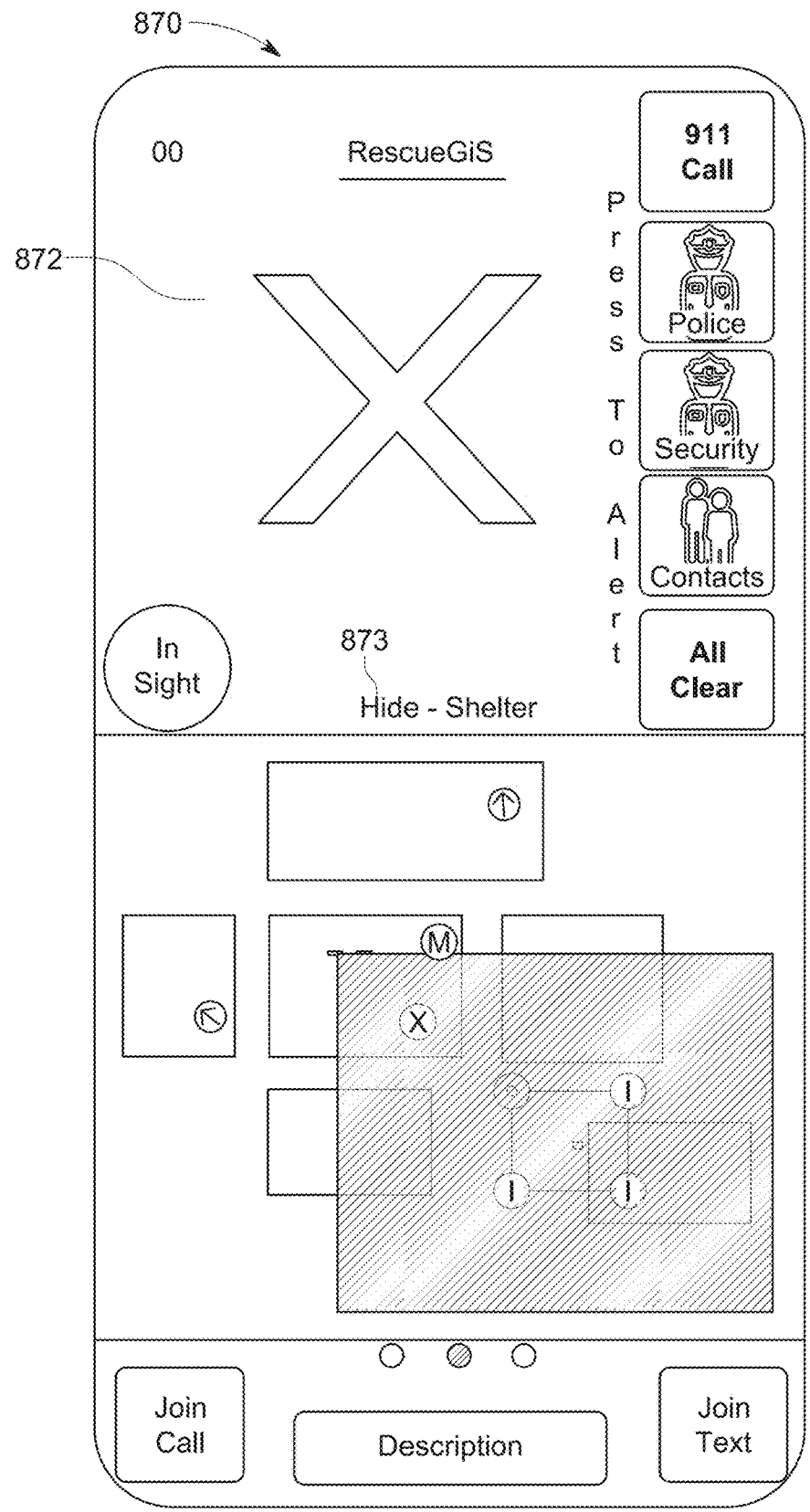
FIG. 25B is a screen shot of a user mobile phone application, with shelter-in-place directions, according to the present invention.

FIG. 25B is a screen shot of a user mobile phone application 870, with shelter-in-place directions 872 such as an "X" image, according to the present invention. In addition to shelter-in-place directions 872, application 870 may provide text instructions 873 such as "Hide-Shelter". In all other respects but for shelter-in-place directions being provided instead of escape directions, mobile phone application 870 is the same as mobile phone application 830.

Figure 26A:
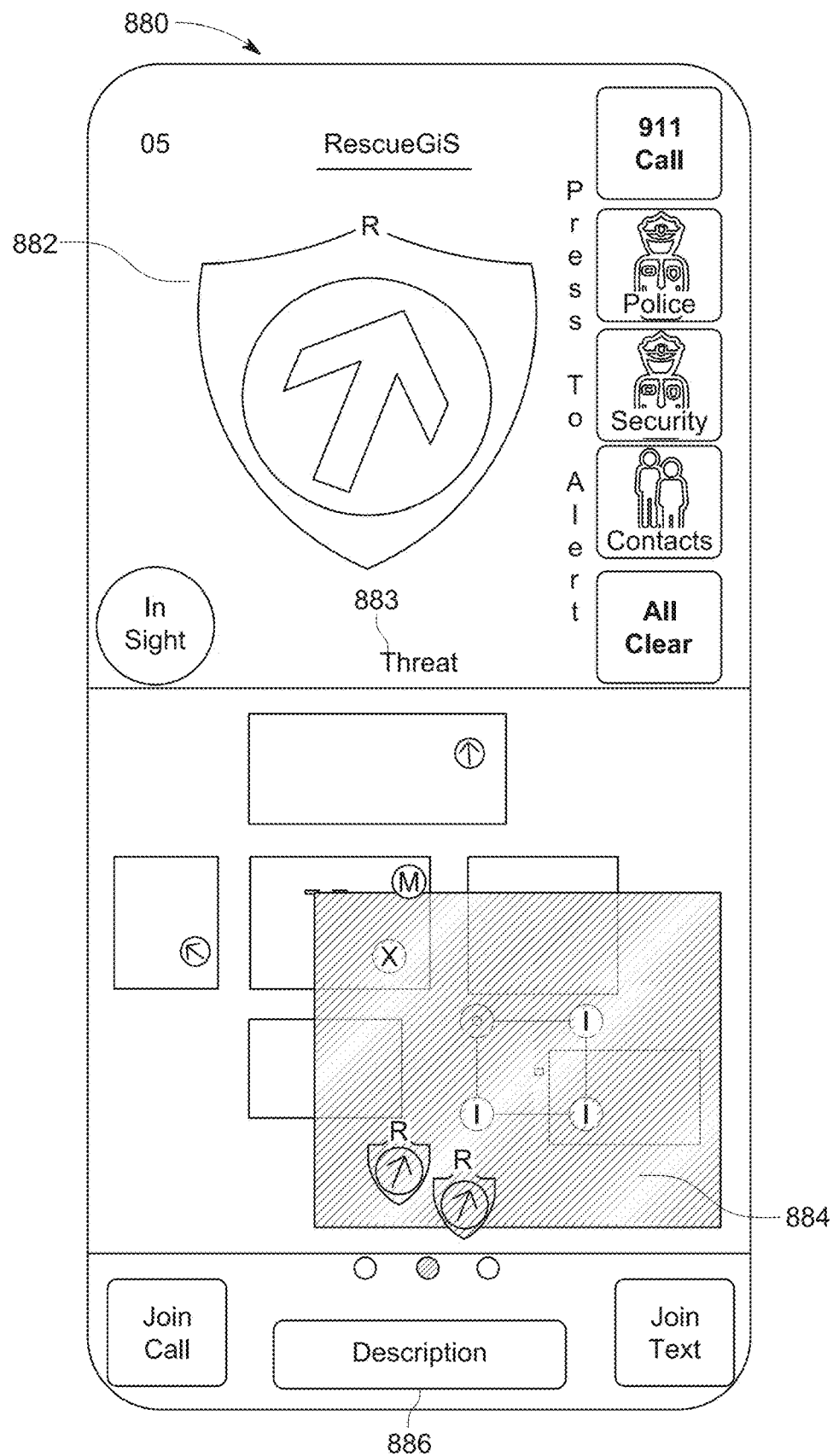
FIG. 26A is a screen shot of a rescue contact responder mobile phone application, with threat directions, according to the present invention.

FIG. 26A is a screen shot of a rescue contact responder mobile phone application 880, with threat directions 882, according to the present invention. Directions 882 point the rescue contact responder to the direction of the threat, and a text description 883 may also be provided. Icons 884 of other rescue contact responders are displayed. Rescue contact responder mobile phone application 880 is otherwise very similar to user mobile phone application 830/870.

Figure 26B:
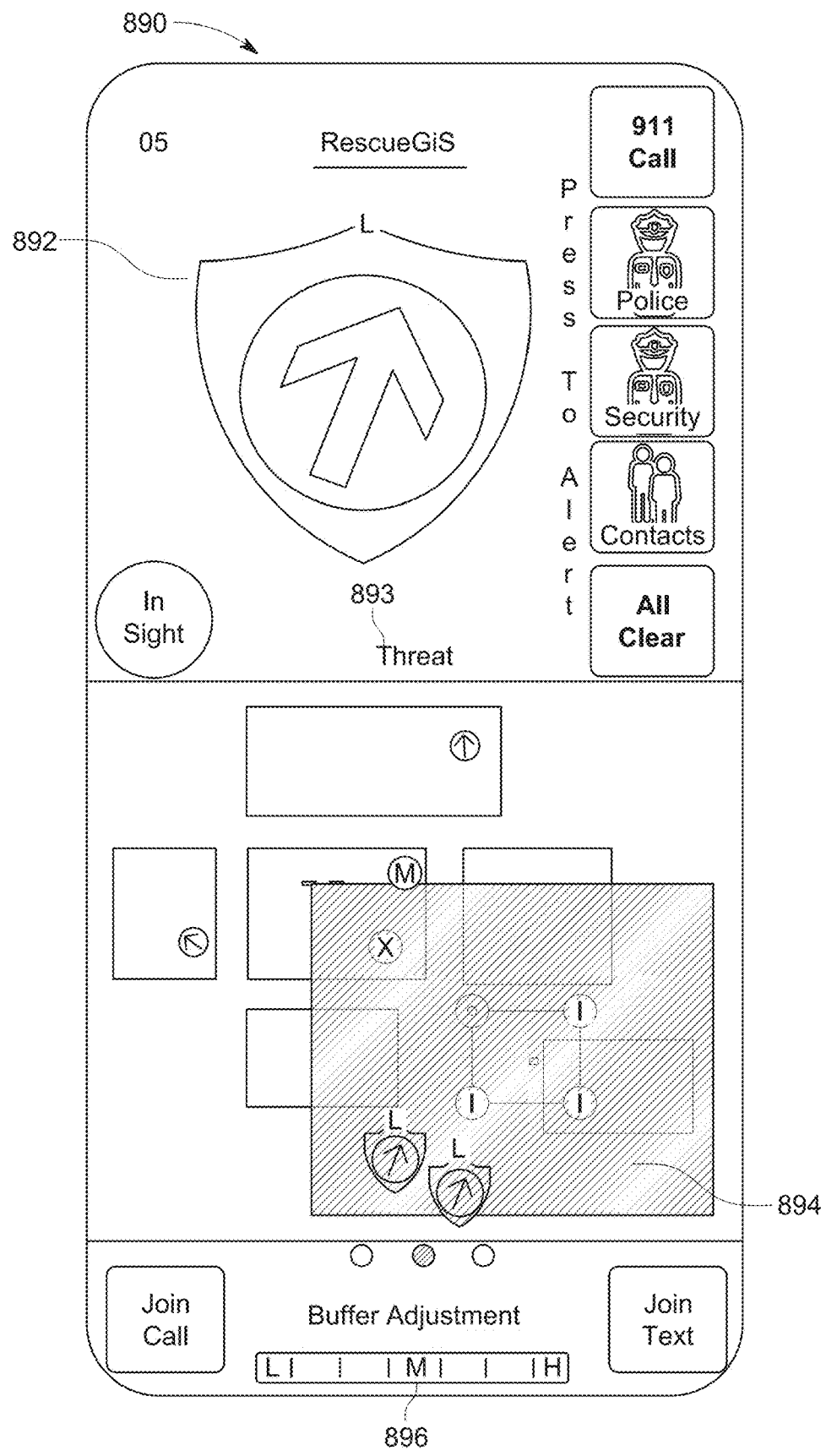
FIG. 26B is a screen shot of a police responder mobile phone application, with threat directions, according to the present invention.

FIG. 26B is a screen shot of a police responder mobile phone application 890, with threat directions 892, according to the present invention. Directions 892 point the police responder to the direction of the threat, and a text description 893 may also be provided. Icons 894 of other rescue contact responders are displayed. In addition, buffer adjustment bar 896 is provided to give the police responder the option to increase or decrease the size of the threat buffer area. Police responder mobile phone application 890 is otherwise very similar to user mobile phone application 830/870.

Figure 27A:
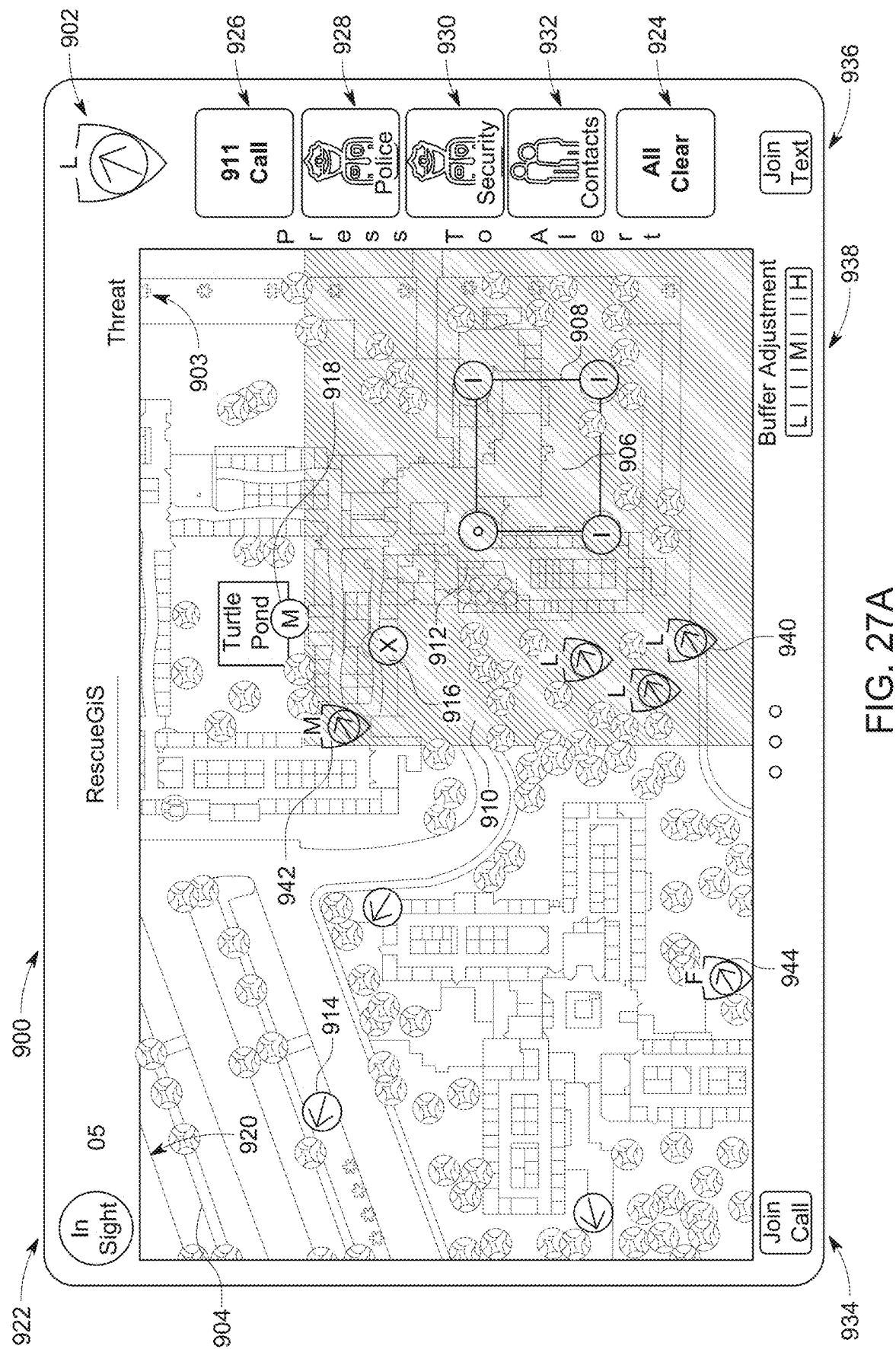
FIG. 27A is a screen shot of a law enforcement mobile tablet application, with threat directions, according to the present invention.

FIG. 27A is a screen shot of a law enforcement mobile tablet application 900, with threat directions 902, according to the present invention. In addition to directional arrow 902 pointing the way to the threat, application 900 may provide text instructions 903 such as "Threat". As can be seen in FIG. 27A, mobile tablet application 900 displays a larger location map 904, with threat location 906, threat area 908, threat buffer area 910, and threat breadcrumb path 912 being defined. Icons representing users in the vicinity of location map 904 and the directions provided to them are displayed, including user escape icon 914, user shelter-hide icon 916 and user medical need icon 918. In addition, icons representing other responders are displayed, including other law enforcement responders 940, medical responders 942, and fire responders 944.

Law enforcement mobile tablet application 900 provides various additional information, options, and inputs. These include: incident countdown 920 is displayed, in-sight alert button 922, all clear button 924, 911 call button 926, contact local police button 928, contact on-site security button 930, contact rescue contacts button 932, join call button 934, join text button 936 and buffer area adjustment slider 938.

Figure 27B:
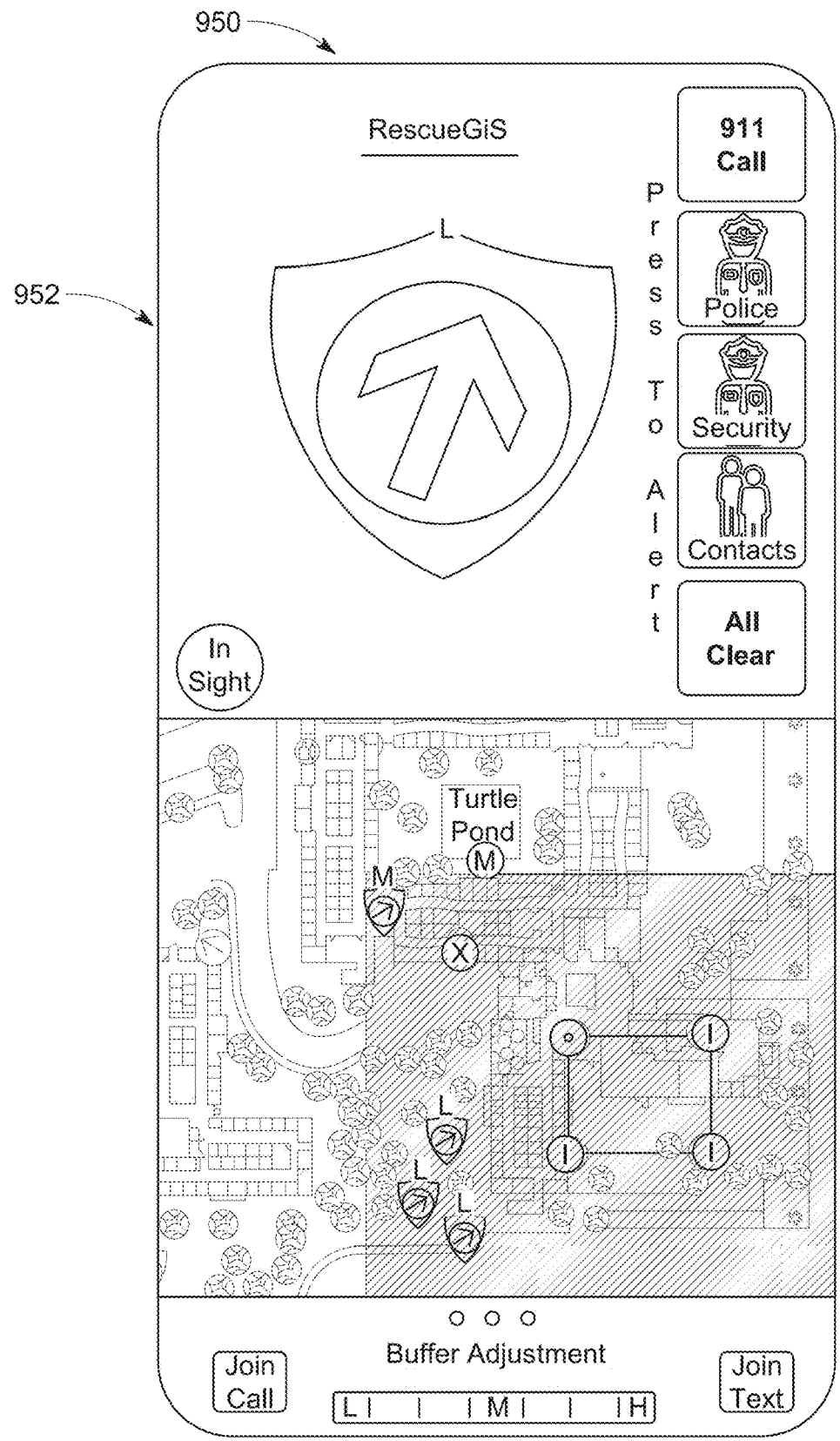
FIG. 27B is a screen shot of a law enforcement mobile phone application, with threat directions, according to the present invention.

FIG. 27B is a screen shot of a law enforcement mobile phone application 950, with threat directions 952, according to the present invention. Law enforcement mobile phone application 950 is essentially the same as mobile tablet application 900, with the various displays, information, options and inputs being presented on a device of smaller size.

Figure 28A:
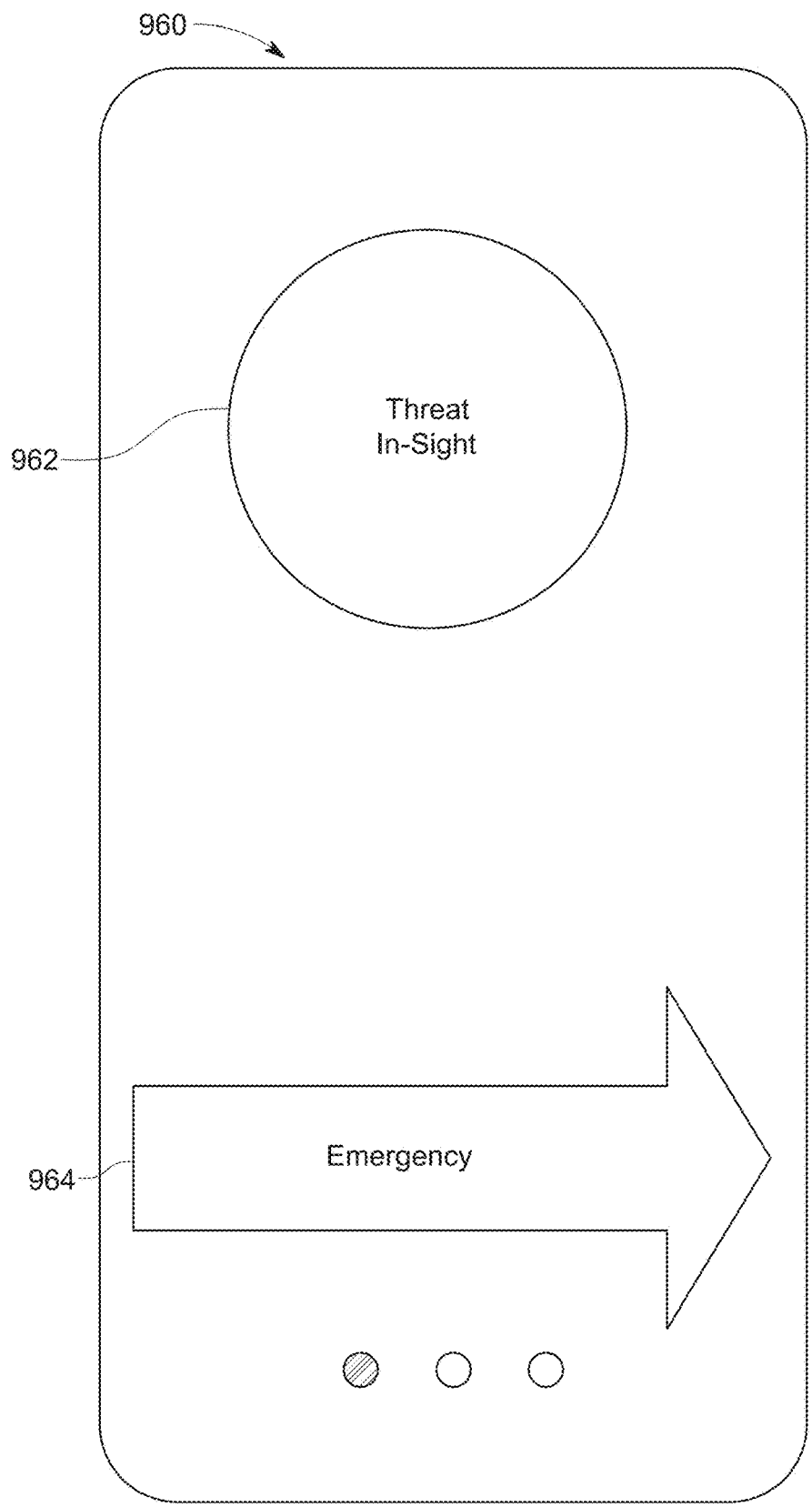
FIG. 28A is a screen shot of a first screen of a user mobile phone application, according to the present invention.
Figure 28B:
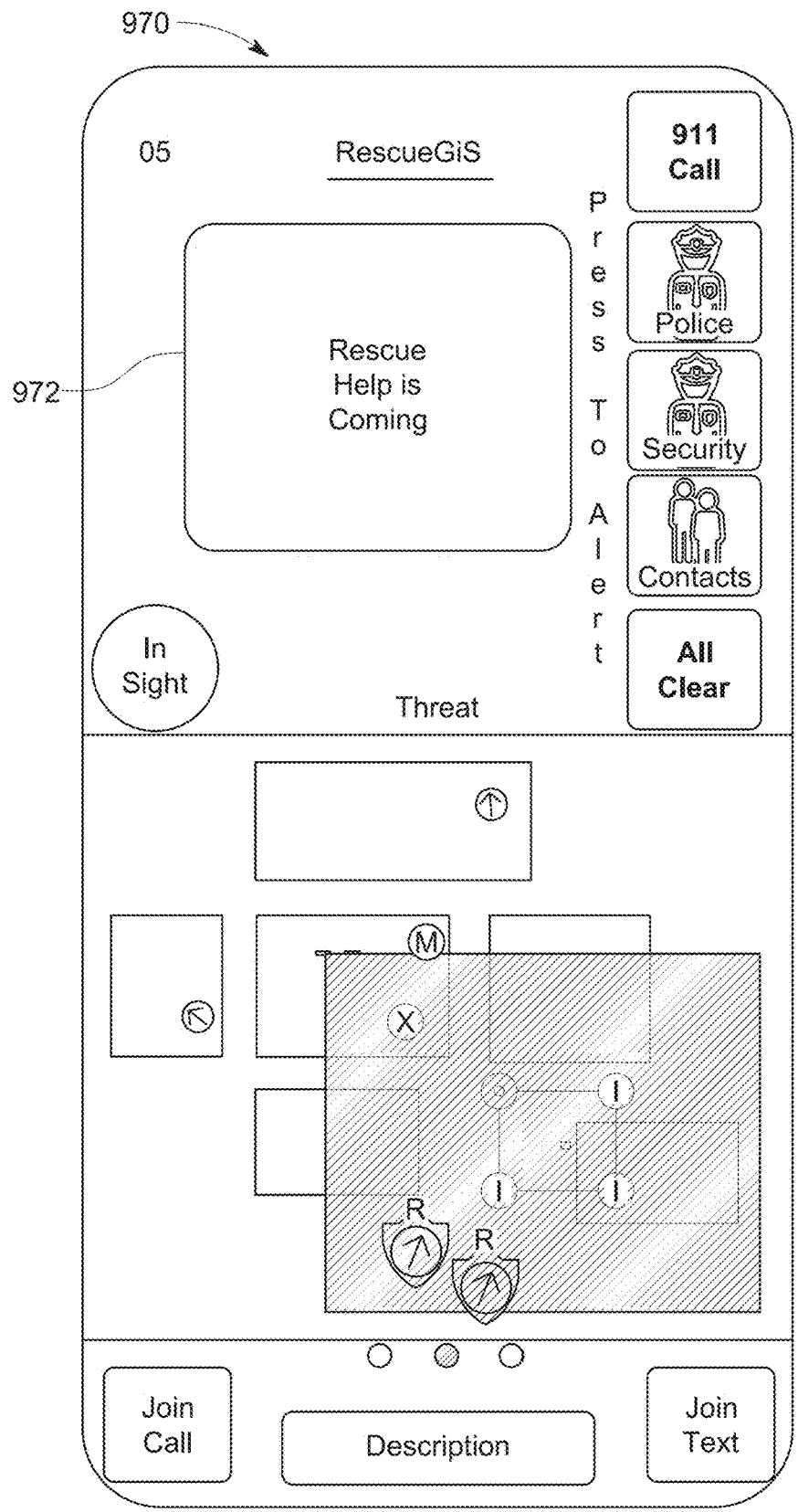
FIG. 28B is a screen shot of a second screen of a user mobile phone application, after threat in-sight button is pressed, according to the present invention.
Figure 28C:
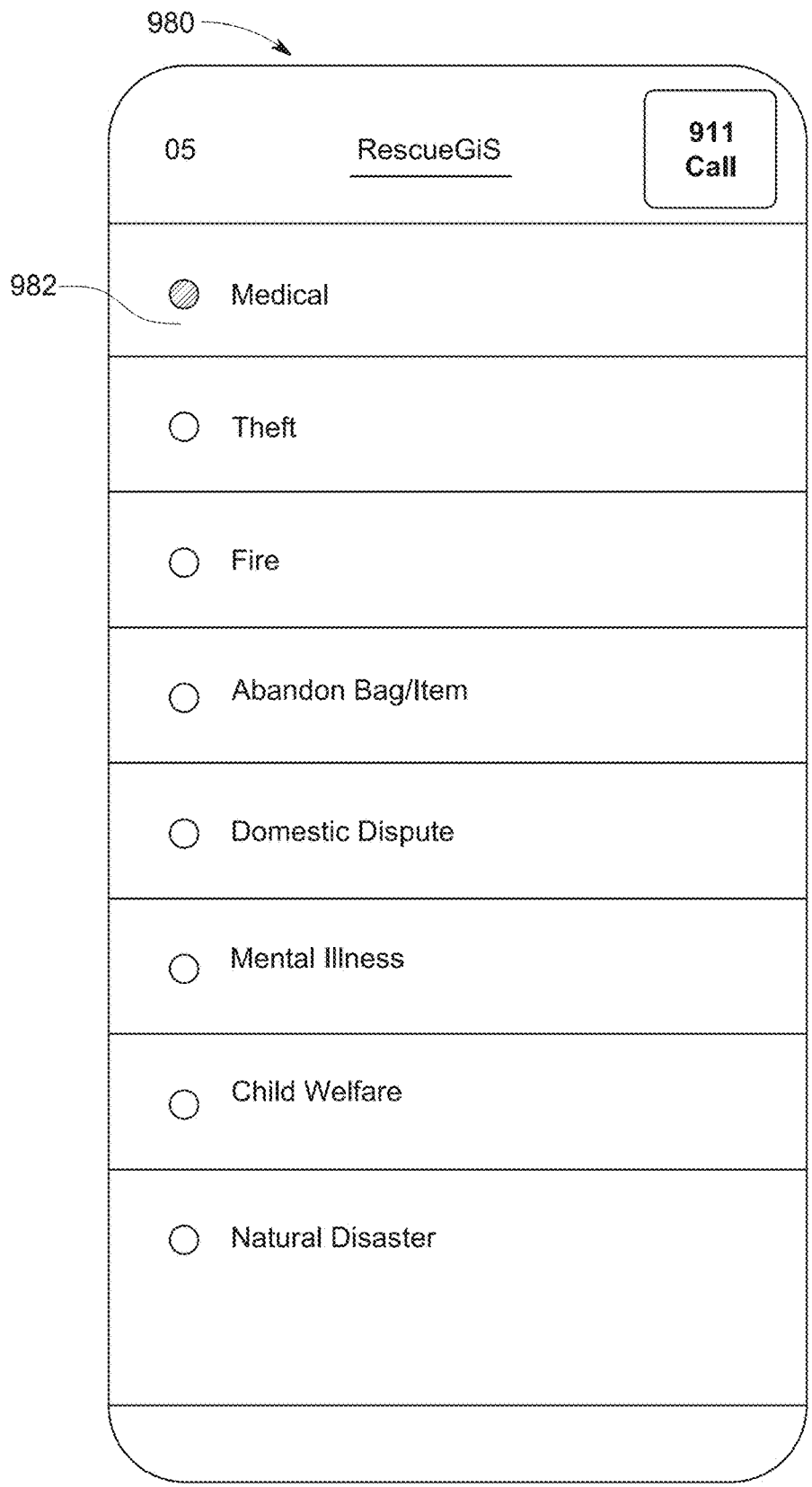
FIG. 28C is a screen shot of a second screen of a user mobile phone application, after the emergency slide is activated, according to the present invention.

FIG. 28A is a screen shot of a first screen 960 of a user mobile phone application, according to the present invention. First screen 960 presents the user with the initial options of pushing threat in-sight button 962 to indicate that a threat is in sight or sliding emergency slider 964 to indicate a medical or other emergency. If threat in-sight button 962 is pressed, a second screen 970 is displayed (FIG. 28B). Second screen 970 is essentially the same as mobile applications 830/870 of FIGS. 25A and 25B, with an initial status text 972 such as "Rescue Help Is Coming" being displayed. If emergency slider 964 is activated, second screen 980 is displayed (FIG. 28C). Second screen 980 presents the user with options 982 to indicate the type of emergency that they are experiencing. These may include, for non-limiting purposes of illustration, a medical emergency, theft, fire, an abandoned bag or item, a domestic dispute, mental illness, child welfare or a natural disaster.

Figure 18:
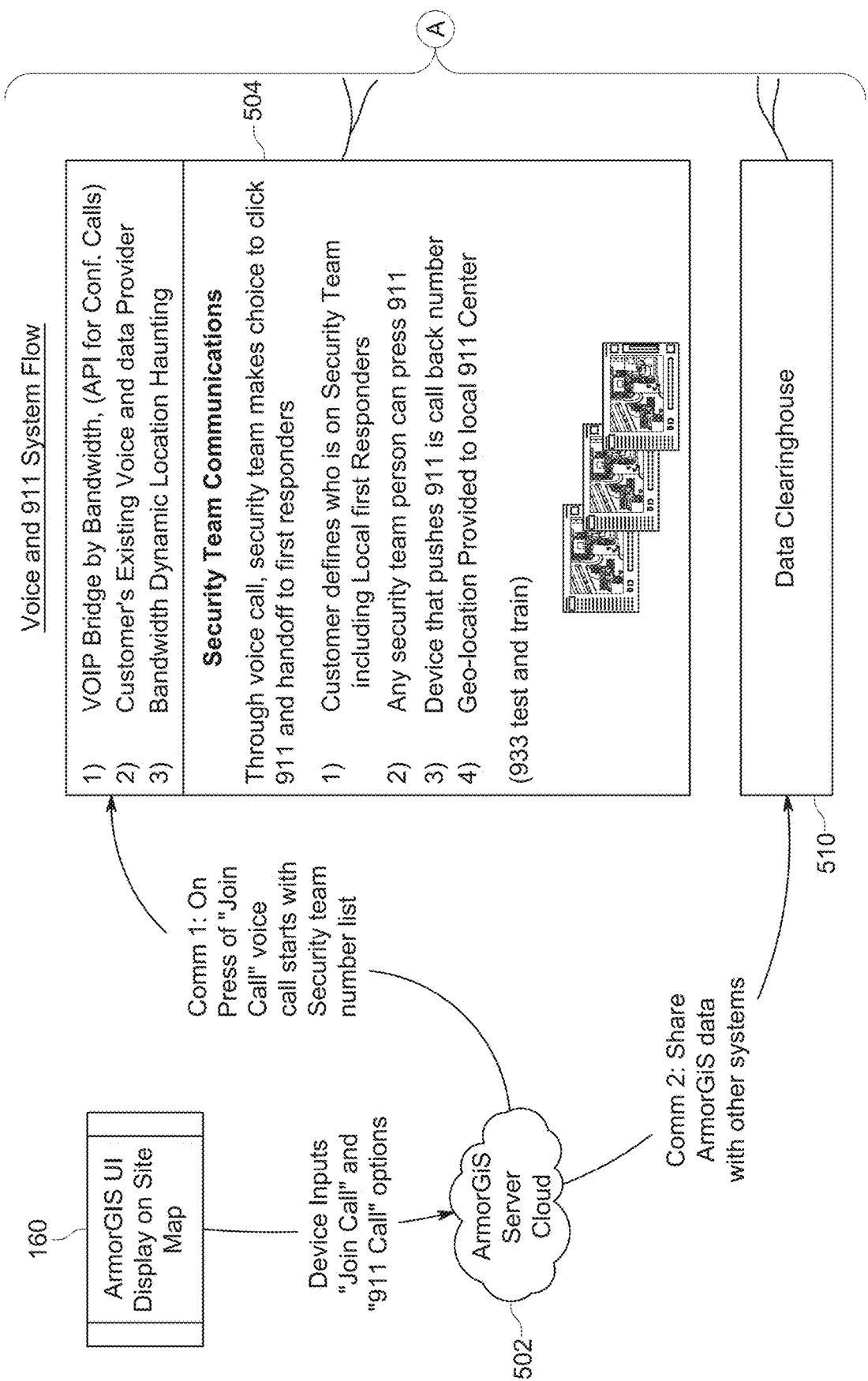
FIG. 18 is a diagram showing voice and 911 call flow, according to the present invention.
Figure 18:
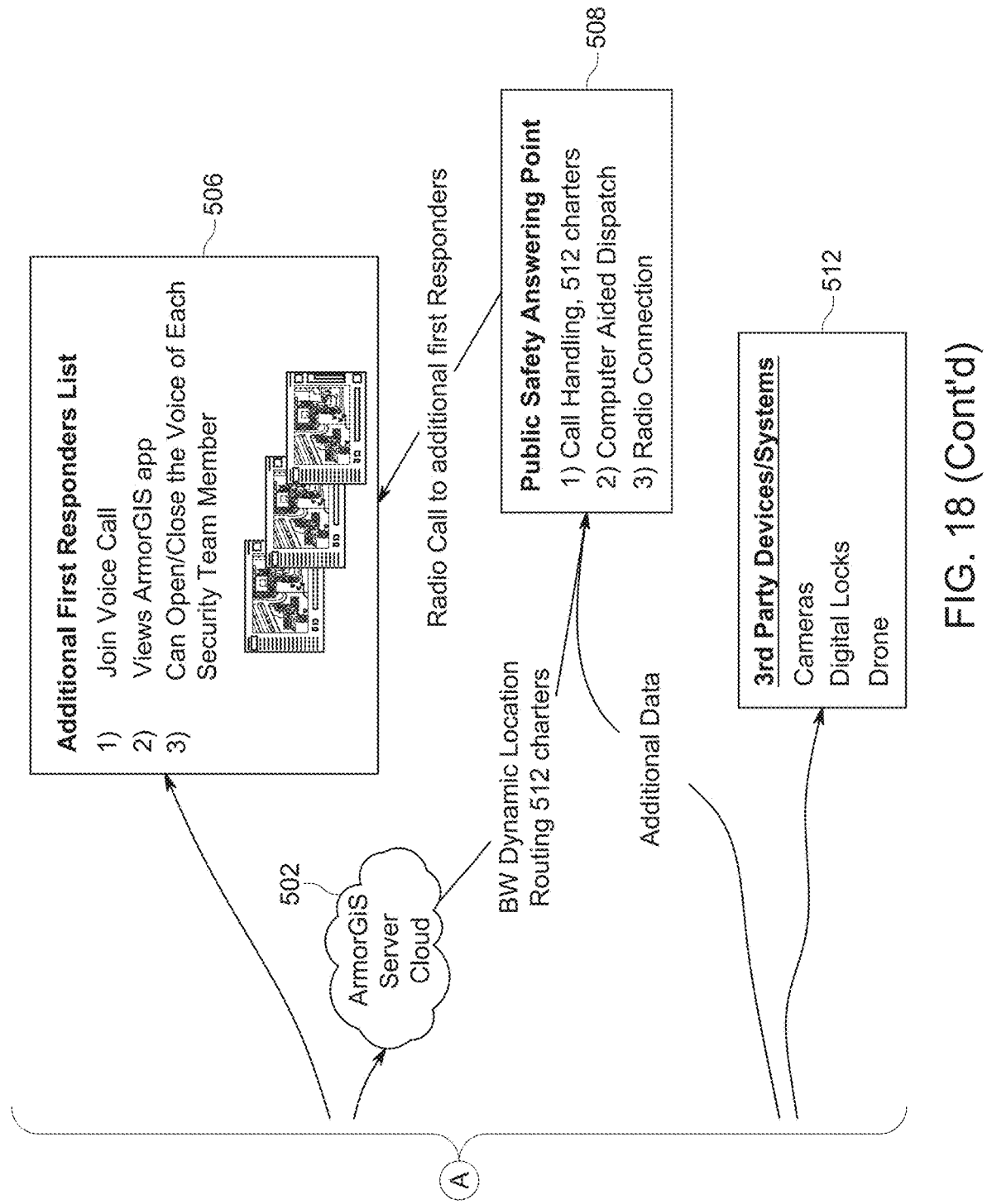

FIG. 18 is a diagram showing voice and 911 call flow according to the present invention. Voice and 911 call flow is initiated when "Join Call" button 168 or "Call 911" button 170 is actuated on mobile application 160. These inputs are communicated to server cloud 502, which in turn communicates with security team center 504. On the press of "Join Call" button 168, a voice call is started between the user of mobile application 160 and security team center 504. The call may be initiated, for example, by VOIP bridge by bandwidth (API for conference calls); by the user's existing voice and data provider; or by bandwidth dynamic location routing.

Once the call is initiated, the security team makes the decision to call (or not call) a 911 center and/or handoff to first responders. Typically, the customer (i.e., the party to be protected) defines who is on the security team, including local first responders. Once the call is initiated, any security team member can press 911. The phone number of the user mobile device that pressed "Call 911" button 170 is used as the 911 call back number. The geo-location of the threat location is provided to the local 911 call center regardless of the locale of the security team member who presses the 911 call button. A 933 call can also be used for testing without creating an actual 911 alert.

Depending on the incident type and severity, security team center 504 may communicate with additional first responders 506. Additional first responders 506 may join an ongoing voice call, view the mobile application user interface (with permissions based on their user profile). These permissions may include, for example, the ability to open/close the voice of each security team member. Security team center 504 may also communicate via server cloud 502 with public safety answering point (PSAP) 508. This communication may be, for example, by bandwidth dynamic location or in accordance with routing 512 charters. PSAP 508 may perform call handling in accordance with 512 charters, computer aided dispatch and radio connection. PSAP 508 may also make a radio call to additional first responders 506.

As shown in FIG. 18, a "Join Call" or "Call 911" input from a mobile application user may also be communicated to data clearinghouse 510, for the purpose of sharing the data generated by system 50 with other systems. Sharing of data with various groups and systems in a given area creates a unified area wide GIS driven response system of shared information. Data clearinghouse 510 may share data, for example, with third party devices/systems 512 such as cameras, digital locks, drones, and the like. In addition, data clearinghouse 510 may share data with PSAP 508. In addition, through device pairing with the IoT devices, additional devices may be utilized to provide further data input into the system, such as devices indicating directional movement of people and their equipment and distance measuring devices.

Figure 19:
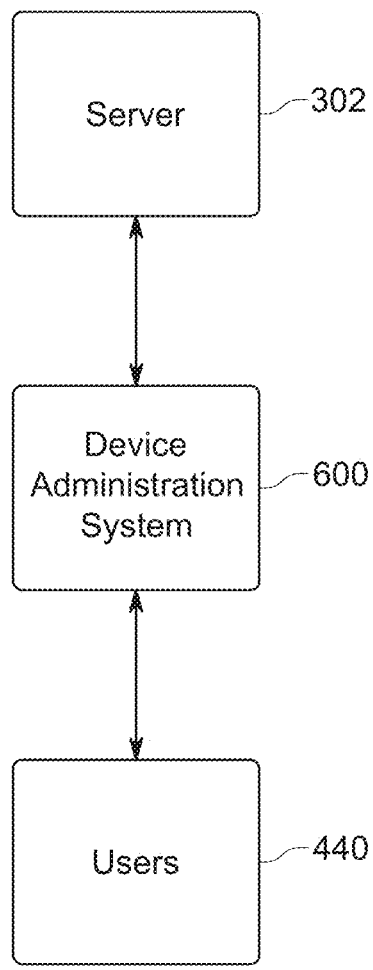
FIG. 19 is a diagram showing a device administration system, according to the present invention.

As shown in FIG. 19, the present invention may also provide a device administration system 600 to allow a maintenance manager or system administrator, for example, to perform administration and monitoring of the IoT devices. Functionality such as customer management, user roster management, device settings and customer set up may be provided by device administration system 600. In one embodiment, device administration system 600 is implemented in an on-line cloud-based customer relationship management platform, such as that provided by Salesforce, or an alternative platform.

Device administration system 600 is in two-way communication with server 302. Information concerning IoT devices 100 may be received from server 302 and indicated on the user interface. This information may include, for example, battery levels of each device and health checks of the device, such as an offline indication for any device that was expected to have an online notification. The ability to order new or additional IoT devices, and to add and remove IoT devices from the system may be provided. Administrators may receive customer support, for example, through a knowledge base lookup or by submitting a support case.

Users 440 including protected persons/staff, security teams and local responders, 911 centers and other device integrations may have access to device administration system 600, which may vary based on their user profile and permissions.

Use Cases

There are many environments and scenarios in which the present invention may be advantageously deployed, in addition to the alerts and response to a threat scenario as described above. Set forth below are multiple non-limiting use cases in which the system of the present invention may be deployed. These use cases are for purposes of illustration only, and do not limit the scope of the invention. Many other scenarios exist in which the present invention may be advantageously deployed.

Precision Responder Operations

In many precision responder operations there is a need to locate threats, responders, and people in need, and a need for instant and coordinated rescues. In law enforcement operations, there is often a need to identify and track criminals in crowds and low visibility environments. The system of the present invention may function as a real-time criminal location tool. Firefighters may benefit from the indoor positioning system (IPS) described above to improve rescue precision and resource management. Open water and other search and rescue operations can utilize the system of the invention as a remote search and rescue system to see what others cannot and to locate victims with only sparse information. Wildfire fighting operations can benefit from improved water drop accuracy and hot spot personnel positioning by deploying the system of the invention.

In all these scenarios, the present invention provides the advantages of precise responder location, improved resource management and multiplied responder resources. The components of the invention (described above) needed for these, and other precision responder operations include mobile phone or pad devices, responder IoT devices or badge devices, along with anchors and gateways that may be vehicle mounted or tripod mounted for rapid deployment or "drop and go".

First Responders—Increased Effectiveness

People in cities, parks, beaches, etc. can stay safe by use of the system of the present invention. With one press of the in-sight button or the med-alert slide switch, the location of a person in need is instantly provided to responders or to Next Generation 911 (NG911). NG911 modernizes 911 infrastructure by allowing the public to send digital data to 911 call centers, or to public safety answering points (PSAPs), and allows the 911 call centers and PSAPs to receive data from other transmitting devices such as the IoT devices and badge devices of the present invention. A rescue/response operation can be mounted within seconds of a button being pressed by a person in need. The effectiveness of first responders is increased using the rescue location intelligence and resource management features of the present invention.

Deployment of the system of the present invention in cities effectively creates smart cities, providing advanced rescue systems for citizens to prevent harm from violence before it occurs and to expedite medical response at any location. Public signs may be placed advising the public that a rescue location alert system is in place with instructions or QR codes for downloading the mobile application needed to use the system. Accurate outdoor and indoor positioning with instant alerts to nearby responders enables directional guidance and coordinated rescues within seconds. The system of the present invention can provide approximately 25× faster response time (60 seconds versus 25 minutes). Responders are provided with directional guidance to the person in need, can make a precise location response, and can multiply available resources. Cities can define their notifications to responders and to NG911. Neighborhood driven policing (NDP) technology may be utilized.

This use case scenario—increasing the effectiveness of first responders to people in need in cities, parks, beaches, and any other public space—may be implemented using existing mobile devices with the mobile application downloaded, and public signs advising the public of the availability of the system and instructions for downloading the mobile application to their mobile device. In one implementation first responders can identify a threat and alert others within the vicinity to shelter or escape.

Disaster Response and Coordination

The present invention is highly effective for disaster response and coordination. Battery-powered "drop and go" gateways can be rapidly deployed in areas suffering from failed communication, power and/or infrastructure to create advanced rapid deployment positioning systems that can be used in search and rescue operations to locate victims and responders and to expedite medical assistance. Disaster teams can instantly coordinate search areas and victim care. Victims can be tagged, and search areas cleared. Accurate outdoor and indoor positioning of responders and victims enables coordinated search areas, rescues, responder directional guidance to victims, and victim geolocation all the way to hospital arrival. A "press and hold" user interface may be provided for responders to indicate that a victim is stable.

Components of the invention required for the disaster response and coordination use case may include battery-powered drop and go gateways, IoT badge devices, and existing mobile phone and pad devices on which the mobile application is downloaded.

Incident-Paired Responses and Local Policing

Communities demand incident-paired responses and localized policing. By utilizing the system of the present invention, the type of alert is known (in-sight button press=threat; med-alert slide switch=medical need), and a response appropriate to the incident type can be made. Non-limiting examples of incident types include fire, suspicious person, abandoned bag, domestic dispute, mental illness, child welfare, and natural disaster. In addition, based on the geolocation of the threat or medical need, an appropriate local police response can be made based on the incident type.

Private and Public Sites and Parcels

The system of the present invention may be deployed in private and public sites and parcels, which may be indoors, outdoors, or remote areas. Examples include, without limitation, businesses, schools, places of worship, government buildings, stores, sports venues, concert venues and neighborhoods. Alerts and directional guidance can be provided to staff and guests who have opted in. Protection can be provided both onsite and offsite.

Private sites, parcels, and accounts such as corporations and businesses prioritize improved workplace safety and recognize the value of staff safety during off hours. The present invention provides advanced rescue systems for staff and guests, prevents harm from violence, and expedites medical responses at any location. Accurate outdoor and indoor positioning is provided with instant alerts to nearby responders, enabling directional and shelter guidance and coordinated rescues within seconds. Response time may be improved by 60× or more (10 seconds vs 10 minutes). Site-defined notifications may be made to responders and NG911, and adjacent site and parcel threat alert notifications may be provided.

Components of the invention required for private and public site and parcel use cases include anchor beacons, gateways, IoT badge devices and phone and pad mobile devices on which the mobile application is downloaded.

The methods and techniques described herein may be performed by computer systems such as those embodied by IoT devices 100, and the servers of IoT device management system component 200, IoT device data computation component 300 and GIS system processing and site map component 400. Processors of these components, such as processor 102 of IoT device 100 and processors in the servers of components 200, 300, 400, execute one or more sequences of instructions contained in a memory, such as memory 104 of IoT device 100 and memories in the servers of components 200, 300, 400. Execution of the instructions contained in these memories cause processors to perform the methods and techniques described herein.

Memory 104 of IoT device 100, as well as the memories utilized in components 200, 300 and 400, may be any non-transitory computer-readable or machine-readable medium that is suitable for storing or transmitting information in a form (e.g., software instructions or processing applications) readable by a computer or machine. Common forms of such media include magnetic storage media, optical storage media (e.g., CD-ROM), magneto-optical storage media, read-only memory (ROM), random access memory (RAM), erasable programmable memory (e.g., EPROM and EEPROM), flash memory, or other media suitable for storing electronic instructions.

The present invention includes various methods and steps that may be performed by hardware components or may be embodied in machine-executable instructions, which cause a general-purpose or special-purpose processor programmed with those instructions to perform the methods and steps of the invention. The methods and steps may be performed by a combination of hardware, software and/or firmware.

The systems, methods, techniques, instruction sequences and/or computer program products described herein are but one embodiment of the present invention. The invention may be implemented in other ways, and the specific order or hierarchy of the steps of the methods described herein may be altered while remaining within the scope of the invention.

Various changes may be made in the form, construction and arrangement of the components described herein without departing from the scope of the invention and without sacrificing its attendant advantages. To give one example, the components of the GIS system may be combined into less than or more than three components 200, 300 and 400. The GIS system being separated into three separate components is merely one implementation example. Many variations, modifications, additions, and improvements are possible and fall within the scope of the invention as defined in the following claims.

What is claimed is:

1. An early alert and location intelligence geographic information system (GIS) comprising:
    a plurality of Internet of Things (IoT) devices; and
    a GIS system, wherein
        the GIS system tracks locations and movements of the IoT devices;
        the GIS system is activated when an IoT device signals detection of an incident such as a threat or a medical need;
        based on processing by the GIS system, smart alerts are provided on user IoT devices, and GIS locations are indicated on a mobile software application of a user;
        the GIS system communicates escape directions and shelter guidance to the mobile software application; and
        smart alert escalations are provided as needed to personnel such as on-site security, law enforcement, first responders and 911 dispatchers; and precise location intelligence is shared in real-time with the personnel; and
    a positioning system implemented with ultra-wide band (UWB) technology, the positioning system comprising a plurality of anchor beacons that communicate via UWB with badge IoT devices.

2. The system of claim 1, wherein the anchor beacons communicate UWB location data of the IoT devices to gateways via Wi-Fi or Ethernet communication.

3. The system of claim 1, wherein
    the anchor beacons communicate UWB location data of the IoT devices to gateways;
    the gateways are geolocated, cellular-connected, and battery-powered; and
    the gateways power the anchor beacons via a physical connection.

4. The system of claim 2, wherein
    the gateways communicate the UWB location data of the IoT devices to a real time location system (RTLS) software server; and
    the RTLS software server communicates the UWB location data to an artificial intelligence (AI) and geographic information system (GIS) server.

5. An early alert and location intelligence geographic information system (GIS) comprising:
    a plurality of Internet of Things (IoT) devices; and
    a GIS system, wherein
        the GIS system tracks locations and movements of the IoT devices;
        the GIS system is activated when an IoT device signals detection of an incident such as a threat or a medical need;
        based on processing by the GIS system, smart alerts are provided on user IoT devices, and GIS locations are indicated on a mobile software application of a user;
        the GIS system communicates escape directions and shelter guidance to the mobile software application;
        smart alert escalations are provided as needed to personnel such as on-site security, law enforcement, first responders and 911 dispatchers; and precise location intelligence is shared in real-time with the personnel;
        multiple inputs from multiple users involved in the incident are stored and used by artificial intelligence (AI) algorithms to ensure that the most relevant inputs based on time and locations are used to predict a threat location and to send notifications;
        additional inputs are determined to be part of a same incident, an input outlier, or a new incident;
        notifications are sent to others near the threat to communicate escape directions based on distance from the threat and threat levels such as alarm, alert and awake; and
        notifications are sent to responders near the threat to communicate direction to a rescue location.

6. The system of claim 5, wherein the mobile software application has a user interface comprising an in-sight button and a med-assist slide switch.

7. The system of claim 5, further comprising a positioning system implemented with Bluetooth technology.

8. The system of claim 5, wherein
    users located on a parcel or site are alerted based on a threat level of the incident and are guided to escape or shelter in place based on proximity to the incident;
    responders are alerted based on user profile and/or proximity to a rescue location in event of the threat or a medical alert; and
    a rescue location is displayed to an alerted responder that is nearby.

9. The system of claim 5, wherein a mobile device of the user and/or a responder places a call to a 911 center and the system shares a rescue location with the 911 center.

10. The system of claim 5, where a location of the threat or medical need determines geographic information and other settings used by the system.

11. An early alert and location intelligence geographic information system (GIS) comprising:
- a plurality of Internet of Things (IoT) devices, wherein
  - each of the IoT devices comprises a microphone that continuously captures sound recordings recorded in continuous sixty second loops;
  - each of the IoT devices comprises an in-sight button that is pressed when a threat is in sight; and
  - when the in-sight button is pressed, a prior sixty second recording is saved for later analysis, and a continuous sound recording is made until an all-clear input is made to end an incident; and
- a GIS system, wherein
  - the GIS system tracks locations and movements of the IoT devices;
  - the GIS system is activated when an IoT device signals detection of the incident such as the threat or a medical need;
  - based on processing by the GIS system, smart alerts are provided on user IoT devices, and GIS locations are indicated on a mobile software application of a user;
  - the GIS system communicates escape directions and shelter guidance to the mobile software application; and
  - smart alert escalations are provided as needed to personnel such as on-site security, law enforcement, first responders and 911 dispatchers; and precise location intelligence is shared in real-time with the personnel.

12. An early alert and location intelligence geographic information system (GIS) comprising:
- a plurality of Internet of Things (IoT) devices; and
- a GIS system, wherein
  - the GIS system tracks locations and movements of the IoT devices;
  - the GIS system is activated when an IoT device signals detection of an incident such as a threat or a medical need;
  - based on processing by the GIS system, smart alerts are provided on user IoT devices, and GIS locations are indicated on a mobile software application of a user;
  - the GIS system communicates escape directions and shelter guidance to the mobile software application;
  - smart alert escalations are provided as needed to personnel such as on-site security, law enforcement, first responders and 911 dispatchers; and precise location intelligence is shared in real-time with the personnel;
  - multi-site alerts are provided to adjacent and nearby sites;
  - an adjacent site receiving a multi-site alert has an option to either accept or not accept the multi-site alert; and
  - upon acceptance of the multi-site alert, a threat location center, active devices, and a buffer area appear as a multi-site view in a system of the adjacent site.

13. An early alert and location intelligence geographic information system (GIS) comprising:
- a plurality of Internet of Things (IoT) devices, wherein
  - the IoT devices comprise an in-sight button that is pressed when a threat is in sight and through which a calculated center of threat is determined;
  - a compass-heading data field of a mobile device is captured at regular time intervals and when camera video is on to enhance accuracy of the calculated center of threat; and
  - a compass magnetometer using north sensing IoT device hardware and north directional transmitting anchors and/or gateways is used to enhance accuracy and reliability of the compass-heading data field; and
- a GIS system, wherein
  - the GIS system tracks locations and movements of the IoT devices;
  - the GIS system is activated when an IoT device signals detection of an incident such as the threat or a medical need;
  - based on processing by the GIS system, smart alerts are provided on user IoT devices, and GIS locations are indicated on a mobile software application of a user;
  - the GIS system communicates escape directions and shelter guidance to the mobile software application; and
  - smart alert escalations are provided as needed to personnel such as on-site security, law enforcement, first responders and 911 dispatchers; and precise location intelligence is shared in real-time with the personnel.

14. An early alert and location intelligence geographic information system (GIS) comprising:
- a plurality of Internet of Things (IoT) devices, wherein
  - the IoT devices comprise an in-sight button that is pressed when a threat is in sight and through which a calculated center of threat is determined;
  - the IoT devices comprise wearable IoT glasses; and
  - a compass-heading data field of the wearable IoT glasses provides a visual orientation of a user that is used to determine a direction of the threat relative to the user; and
- a GIS system, wherein
  - the GIS system tracks locations and movements of the IoT devices;
  - the GIS system is activated when an IoT device signals detection of an incident such as the threat or a medical need;
  - based on processing by the GIS system, smart alerts are provided on user IoT devices, and GIS locations are indicated on a mobile software application of the user;
  - the GIS system communicates escape directions and shelter guidance to the mobile software application; and
  - smart alert escalations are provided as needed to personnel such as on-site security, law enforcement, first responders and 911 dispatchers; and precise location intelligence is shared in real-time with the personnel.

15. An early alert and location intelligence geographic information system (GIS) comprising:
- a plurality of Internet of Things (IoT) devices; and
- a GIS system, wherein
  - the GIS system tracks locations and movements of the IoT devices;
  - the GIS system is activated when an IoT device signals detection of an incident such as a threat or a medical need;
  - based on processing by the GIS system, smart alerts are provided on user IoT devices, and GIS locations are indicated on a mobile software application of a user;
  - the GIS system communicates escape directions and shelter guidance to the mobile software application;
  - smart alert escalations are provided as needed to personnel such as on-site security, law enforcement, first responders and 911 dispatchers; and precise location intelligence is shared in real-time with the personnel;
  - pre-chosen emergency contacts are alerted based on proximity to a rescue location in event of the threat or a medical alert; and the rescue location is displayed to an alerted emergency contact that is nearby.

16. An early alert and location intelligence geographic information system (GIS) comprising:
    a plurality of Internet of Things (IoT) devices, wherein a user has multiple mobile and wearable IoT devices, and the system determines which location is best for use and tracks the multiple and wearable IoT devices separately if they become separated from each other; and
    a GIS system, wherein
        the GIS system tracks locations and movements of the IoT devices;
        the GIS system is activated when an IoT device signals detection of an incident such as a threat or a medical need;
        based on processing by the GIS system, smart alerts are provided on user IoT devices, and GIS locations are indicated on a mobile software application of a user;
        the GIS system communicates escape directions and shelter guidance to the mobile software application; and
        smart alert escalations are provided as needed to personnel such as on-site security, law enforcement, first responders and 911 dispatchers; and precise location intelligence is shared in real-time with the personnel.

17. An early alert and location intelligence geographic information system (GIS) comprising:
    a plurality of Internet of Things (IoT) devices; and
    a GIS system, wherein
        the GIS system tracks locations and movements of the IoT devices;
        the GIS system is activated when an IoT device signals detection of an incident such as a threat or a medical need;
        based on processing by the GIS system, smart alerts are provided on user IoT devices, and GIS locations are indicated on a mobile software application of a user;
        the GIS system communicates escape directions and shelter guidance to the mobile software application;
        smart alert escalations are provided as needed to personnel such as on-site security, law enforcement, first responders and 911 dispatchers; and precise location intelligence is shared in real-time with the personnel;
        the user presses a join call button to join a security team call during the incident;
        the user adjusts a level of severity of the threat from low to medium to high to alert other responders that more assistance is needed; and
        the user presses and holds a med-assist slider to change a medical condition to stable.

18. An early alert and location intelligence geographic information system (GIS) comprising:
    a plurality of Internet of Things (IoT) devices; and
    a GIS system, wherein
        the GIS system tracks locations and movements of the IoT devices;
        the GIS system is activated when an IoT device signals detection of an incident such as a threat or a medical need;
        based on processing by the GIS system, smart alerts are provided on user IoT devices, and GIS locations are indicated on a mobile software application of a user;
        the GIS system communicates escape directions and shelter guidance to the mobile software application;
        smart alert escalations are provided as needed to personnel such as on-site security, law enforcement, first responders and 911 dispatchers; and precise location intelligence is shared in real-time with the personnel; and
        when a responder presses an all-clear button, and a second responder confirms that all is clear, the incident is set back to dormant.

19. An early alert and location intelligence geographic information system (GIS) comprising:
    a plurality of Internet of Things (IoT) devices; and
    a GIS system, wherein
        the GIS system tracks locations and movements of the IoT devices;
        the GIS system is activated when an IoT device signals detection of an incident such as a threat or a medical need;
        based on processing by the GIS system, smart alerts are provided on user IoT devices, and GIS locations are indicated on a mobile software application of a user;
        the GIS system communicates escape directions and shelter guidance to the mobile software application;
        smart alert escalations are provided as needed to personnel such as on-site security, law enforcement, first responders and 911 dispatchers; and precise location intelligence is shared in real-time with the personnel; and
        the user may select add description on the mobile software application and then select a further description of the incident such as fire, suspicious person, abandoned bag, domestic dispute, mental illness, child welfare or natural disaster.

\* \* \* \* \*